(12) United States Patent
Jung et al.

(10) Patent No.: US 12,444,460 B2
(45) Date of Patent: Oct. 14, 2025

(54) MEMORY DEVICE, ELECTRONIC DEVICE, AND OPERATION METHOD OF MEMORY DEVICE

(71) Applicant: SAMSUNG ELECTRONICS CO., LTD., Suwon-si (KR)

(72) Inventors: Minsu Jung, Suwon-si (KR); Jindo Byun, Suwon-si (KR); Joohwan Kim, Suwon-si (KR); Eun Seok Shin, Suwon-si (KR); Hyun-Yoon Cho, Suwon-si (KR); Junghwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 18/541,218

(22) Filed: Dec. 15, 2023

(65) Prior Publication Data

US 2024/0212746 A1    Jun. 27, 2024

(30) Foreign Application Priority Data

Dec. 26, 2022    (KR) .................... 10-2022-0185047

(51) Int. Cl.
*G11C 11/40*     (2006.01)
*G11C 11/4093*   (2006.01)
*G11C 11/4096*   (2006.01)
*H03K 19/017*    (2006.01)

(52) U.S. Cl.
CPC ...... *G11C 11/4096* (2013.01); *G11C 11/4093* (2013.01); *H03K 19/01742* (2013.01); *G11C 2207/2254* (2013.01)

(58) Field of Classification Search
CPC ............ G11C 11/4096; G11C 11/4093; G11C 2207/2254
See application file for complete search history.

(56) References Cited

U.S. PATENT DOCUMENTS

| | | |
|---|---|---|
| 7,479,800 B1 | 1/2009 | Vullaganti et al. |
| 7,888,962 B1 | 2/2011 | Om |
| 9,401,706 B2 | 7/2016 | Tirunagari et al. |
| 9,768,774 B2 | 9/2017 | Riad |
| 9,893,718 B1 | 2/2018 | Shivaram et al. |
| 10,530,325 B1 | 1/2020 | Gonzales et al. |

(Continued)

FOREIGN PATENT DOCUMENTS

KR    10-2021-0126483 A    10/2021

*Primary Examiner* — Han Yang
(74) *Attorney, Agent, or Firm* — Sughrue Mion, PLLC

(57) ABSTRACT

Disclosed is a memory device which includes a pull-up driver that is connected between a power supply voltage and a first node, a T-coil circuit that is connected between the first node and a second node, an external resistor, and a ZQ controller that performs a ZQ calibration operation on the pull-up driver. The ZQ controller includes a path selecting circuit that selects one node among the first node and the second node, a comparing circuit that compares a voltage of the one node selected by the path selecting circuit with a pull-up reference voltage and outputs a comparison result, and a code generating circuit that generates a pull-up code for driving the pull-up driver, based on the comparison result. While the pull-up code is generated, the external resistor is connected between the second node and a ground voltage.

20 Claims, 19 Drawing Sheets

(56) References Cited

U.S. PATENT DOCUMENTS

| | | | |
|---|---|---|---|
| 10,727,895 B1* | 7/2020 | Nguyen | H04B 1/44 |
| 10,897,279 B1 | 1/2021 | Liu et al. | |
| 11,374,603 B2 | 6/2022 | Liu et al. | |
| 2014/0016404 A1* | 1/2014 | Kim | G11C 11/165 |
| | | | 365/158 |
| 2023/0186958 A1* | 6/2023 | Baek | G11C 11/4093 |
| | | | 365/189.07 |

* cited by examiner

FIG. 9A

| Target | ZQ of DRV by CODE_PU1 | ZQ of DRV ($+R_{TC}$) |
|---|---|---|
| 40 | $40 + \frac{1}{6}R_{TC}$ | $40 + \frac{7}{6}R_{TC}$ |
| 48 | $48 + \frac{1}{5}R_{TC}$ | $48 + \frac{6}{5}R_{TC}$ |
| 60 | $60 + \frac{1}{4}R_{TC}$ | $60 + \frac{5}{4}R_{TC}$ |
| 120 | $120 + \frac{1}{2}R_{TC}$ | $120 + \frac{3}{2}R_{TC}$ |
| 240 | $240 + R_{TC}$ | $240 + 2R_{TC}$ |

FIG. 9B

| Target | ZQ of DRV by CODE_PU2 | ZQ of DRV ($+R_{TC}$) |
|---|---|---|
| 40 | $40 - \frac{2}{3}R_{TC}$ | $40 + \frac{1}{3}R_{TC}$ |
| 48 | $48 - \frac{4}{5}R_{TC}$ | $48 + \frac{1}{5}R_{TC}$ |
| 60 | $60 - R_{TC}$ | $60$ |
| 120 | $120 - 2R_{TC}$ | $120 - R_{TC}$ |
| 240 | $240 - 4R_{TC}$ | $240 - 3R_{TC}$ |

//  # MEMORY DEVICE, ELECTRONIC DEVICE, AND OPERATION METHOD OF MEMORY DEVICE

CROSS-REFERENCE TO RELATED APPLICATIONS

This application is based on and claims priority under 35 U.S.C. § 119 to Korean Patent Application No. 10-2022-0185047 filed on Dec. 26, 2022, in the Korean Intellectual Property Office, the disclosures of which are incorporated by reference herein in their entireties.

BACKGROUND

1. Field

Embodiments of the disclosure described herein relate to a semiconductor memory, and more particularly, relate to a memory device, an electronic device, and an operation method of the memory device.

2. Description of Related Art

A semiconductor memory is classified as a volatile memory, in which stored data disappear when a power is turned off, such as a static random access memory (SRAM) or a dynamic random access memory (DRAM) or a non-volatile memory, in which stored data are retained even when a power is turned off, such as a flash memory device, a phase-change RAM (PRAM), a magnetic RAM (MRAM), a resistive RAM (RRAM), or a ferroelectric RAM (FRAM).

Recently, a high-speed memory device is being used, in which, an input/output speed of the memory device is limited due to an input/output capacitance of a driver. In this case, a T-coil circuit is used to reduce the input/output capacitance. However, the T-coil circuit may act as a resistance with respect to the driver, which causes an impedance mismatch between the driver and the channel of the memory device.

SUMMARY

Embodiments of the disclosure provide a memory device with improved reliability and improved performance, an electronic device including the memory device, and an operation method of the memory device.

According to an aspect of the disclosure, there is provided a memory device including: a pull-up driver connected between a power supply voltage and a first node: a T-coil circuit connected between the first node and a second node; an external resistor; and a ZQ controller configured to perform a ZQ calibration operation on the pull-up driver, wherein the ZQ controller includes: a path selecting circuit configured to select one node among the first node and the second node: a comparing circuit configured to: compare a voltage of the one node selected by the path selecting circuit with a pull-up reference voltage, and output a comparison result based the comparison between the voltage of the one node selected by the path selecting circuit and the pull-up reference voltage: a code generating circuit configured to generate a pull-up code for driving the pull-up driver, based on the comparison result, and wherein while the pull-up code is generated, the external resistor is connected between the second node and a ground voltage.

According to another aspect of the disclosure, there is provided an operation method of a memory device, the method including: generating a first pull-up code by comparing a first voltage at a first node between a pull-up driver and a T-coil circuit with a pull-up reference voltage: generating a second pull-up code by comparing a second voltage at a second node between the T-coil circuit and an external resistor with the pull-up reference voltage: generating an offset code corresponding to a resistance of the T-coil circuit, based on the first pull-up code and the second pull-up code: and generating a compensated pull-up code, based on the offset code and a target resistance of the pull-up driver, wherein the pull-up driver, the T-coil circuit, and the external resistor are connected in series between a power supply voltage and a ground voltage.

According to another aspect of the disclosure, there is provided an electronic device including: an input/output pad: a driver configured to output a data signal through the input/output pad: a signal line including a first end electrically connected to the driver and a second end electrically connected to the input/output pad: and a ZQ controller configured to perform a ZQ calibration operation on the driver based on an external resistor, wherein the driver includes: a pull-up driver connected between a power supply voltage and the first end of the signal line: and a pull-down driver connected between the first end of the signal line and a ground voltage, wherein, the ZQ controller is configured to: connect the external resistor and the second end of the signal line: generate a first pull-up code by comparing a first voltage of the first end of the signal line and a pull-up reference voltage: generate a second pull-up code by comparing a second voltage of the second end of the signal line and the pull-up reference voltage: and generate an offset code corresponding to a resistance of the signal line based on the first pull-up code and the second pull-up code.

BRIEF DESCRIPTION OF DRAWINGS

The above and other objects and features of the disclosure will become apparent by describing in detail embodiments thereof with reference to the accompanying drawings.

FIGS. 9A and 9B are diagrams for describing an effect according to a ZQ calibration operation which a ZQ controller of FIG. 4 performs on a pull-up driver.

DETAILED DESCRIPTION

Figure 1:
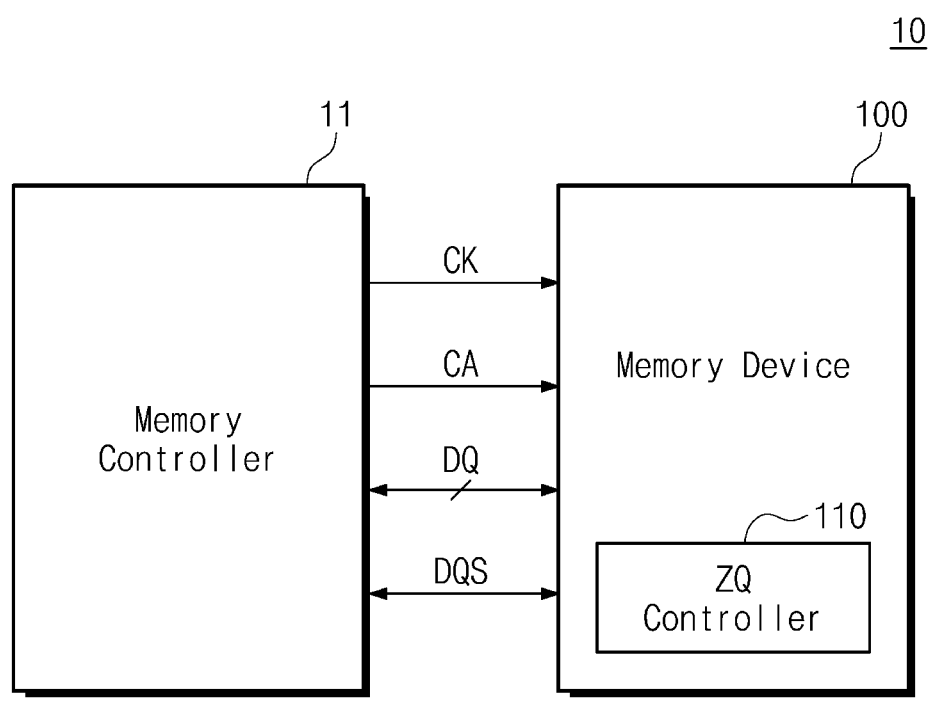
FIG. 1 is a block diagram illustrating a memory system according to an embodiment of the disclosure.

Below, embodiments of the disclosure will be described in detail and clearly to such an extent that an ordinary one in the art easily implements the invention. These embodiments are example embodiments, and thus, the disclosure is not limited thereto and may be realized in various other forms. As is traditional in the field, embodiments may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

According to embodiments of the disclosure, a driver of a memory device configured to drive a data line may include a T-coil circuit for a high-speed operation. The T-coil circuit may act as a resistance with respect to the driver, and the resistance of the T-coil circuit may cause the impedance mismatching. The memory device according to an embodiment of the disclosure may generate a first pull-up code by performing a first ZQ calibration operation in a state where the resistance of the T-coil circuit is included and may generate a second pull-up code by performing a second ZQ calibration operation in a state where the resistance of the T-coil circuit is not included. The memory device may calculate an offset code corresponding to the resistance of the T-coil circuit based on the first and second pull-up codes. The memory device may generate a compensated pull-up code and a compensated pull-down code based on the calculated offset code. The resistance of the T-coil circuit may be compensated for through the compensated pull-up code and the compensated pull-down code. Accordingly, a memory device with improved reliability and improved performance and an operation method thereof are provided.

FIG. 1 is a block diagram illustrating a memory system according to an embodiment of the disclosure. Referring to FIG. 1, a memory system 10 may include a memory controller 11 and a memory device 100. In an embodiment, the memory system 10 may be one of an information processing device, a storage device, or a graphic processing device. However, the disclosure is not limited thereto, and as such, the memory system 10 may be implemented in various forms. According to an embodiment, the information processing device may be a device configured to process a variety of information and to store the processed information. For example, the information processing device may include, but is not limited to, a personal computer (PC), a laptop, a server, a workstation, a smartphone, a tablet PC, a digital camera, or a black box. For example, the storage device may be a storage medium such as a solid state drive (SSD), and the memory device 100 may be used as a buffer memory of the SSD. For example, the graphic processing device may be configured to perform a variety of graphic processing or various operations.

The memory controller 11 may store the data in the memory device 100 or may read the data stored in the memory device 100. For example, the memory controller 11 may send a clock signal CK and a command/address signal CA to the memory device 100 and may exchange a data signal DQ and a data strobe signal DQS with the memory device 100. For example, the memory controller 11 may exchange the data signal DQ and the data strobe signal DQS with the memory device 100 may mean that, through the data signal DQ and the data strobe signal DQS, data "DATA" may be transmitted from the memory controller 11 to the memory device 100 or may be transmitted from the memory device 100 to the memory controller 11. In an embodiment, the memory controller 11 may be a system-on-chip (SoC) such as an application processor (AP).

The memory device 100 may operate under control of the memory controller 11. In an embodiment, the memory device 100 may be a dynamic random access memory (DRAM) device, but the disclosure is not limited thereto. For example, the memory device 100 may include a volatile memory such as an SRAM or a nonvolatile memory such as a PRAM, an MRAM, and/or an RRAM.

In an embodiment, the memory controller 11 and the memory device 100 may communicate with each other through an interface. The interface may be an interface in compliance with a predetermined protocol. For example, the interface may be a high-speed interface such as a double data rate (DDR) interface, a low power DDR (LPDDR) interface, or a graphics DDR (GDDR) interface, but the disclosure is not limited thereto. For example, the interface may include at least one of various interfaces such as a universal serial bus (USB) interface, a multimedia card (MMC) interface, a peripheral component interconnection (PCI) interface, a PCI-express (PCI-E) interface, an advanced technology attachment (ATA) interface, a serial-ATA (SATA) interface, a parallel-ATA (PATA) interface, a small computer small interface (SCSI) interface, an enhanced small disk interface (ESDI), an integrated drive electronics (IDE) interface, a mobile industry processor interface (MIPI), and a nonvolatile memory-express (NVM-e) interface.

In an embodiment, the memory device 100 may include a ZQ controller 110. The ZQ controller 110 may perform the ZQ calibration operation under control of the memory controller 11. For example, the ZQ calibration operation may refer to an operation of adjusting the impedance or strength of an input/output driver of the memory device 100 for the purpose of reducing the impedance mismatching in the signal transmission/reception channel between the memory controller 11 and the memory device 100.

In an embodiment, the memory device 100 may perform the high-speed input/output operation with the memory controller 11. In this case, the input/output speed (or the data transmission speed) between the memory device 100 and the memory controller 11 may be limited due to the input/output capacitance of the input/output driver of the memory device 100. To solve the above issue, the memory device 100 may include a T-coil circuit configured to compensate for the input/output capacitance. The T-coil circuit may act as the resistance in the input/output driver of the memory device 100, and the resistance due to a T-coil may cause the impedance mismatching in the input/output driver.

The ZQ controller 110 of the memory device 100 according to an embodiment of the disclosure may prevent the impedance mismatching caused by the T-coil circuit by compensating for an offset of the resistance due to the T-coil. A configuration of the memory device 100 according to an embodiment of the disclosure will be described in detail with reference to accompanying drawings.

Figure 2:
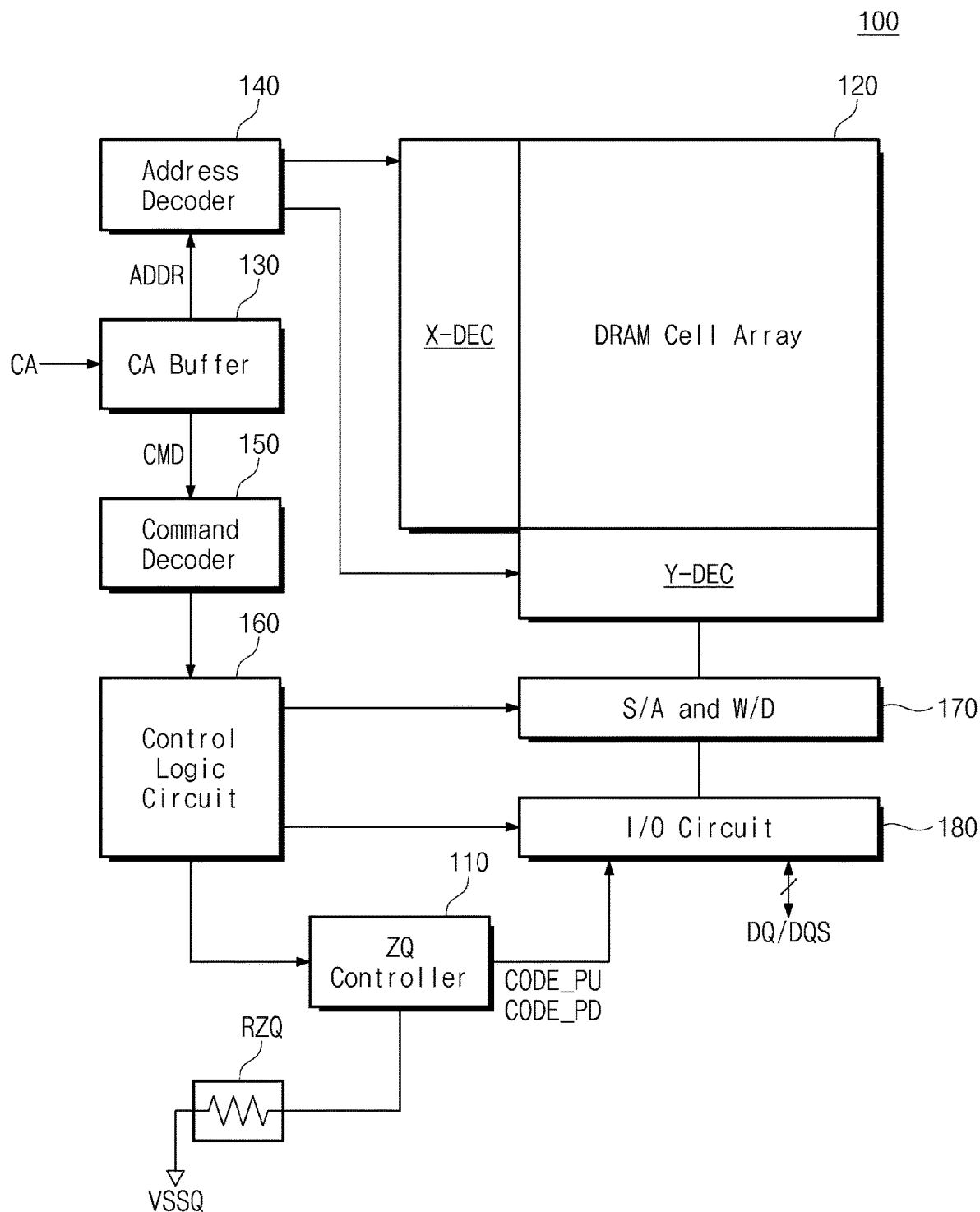
FIG. 2 is a block diagram illustrating a memory device of FIG. 1.

FIG. 2 is a block diagram illustrating a memory device of FIG. 1. Referring to FIGS. 1 and 2, the memory device 100 may include the ZQ controller 110, a memory cell array 120, a command/address (CA) buffer 130, an address decoder 140, a command decoder 150, a control logic circuit 160, a sense amplifier (S/A) and write driver (W/D) 170, and an input/output (I/O) circuit 180.

The memory cell array 120 may include a plurality of memory cells. For example, the memory cell array 120 may be a DRAM cell array. The plurality of memory cells may be connected to a plurality of word lines and a plurality of bit lines. In an embodiment, the plurality of word lines may be driven by an X-decoder (or row decoder) X-DEC, and the plurality of bit lines may be driven by an Y-decoder (or column decoder) Y-DEC.

The CA buffer 130 may be configured to receive the command/address (CA) signals and store the CA signals. For example, the CA buffer 130 may temporarily store or buffer the received signals. The address decoder 140 may decode address signals ADDR stored in the CA buffer 130. The address decoder 140 may control the X-decoder and the Y-decoder based on a decoding result of decoding the address signals ADDR. The command decoder 150 may decode a command CMD stored in the CA buffer 130.

The control logic circuit 160 may control the components of the memory device 100 based on the decoding result of the command decoder 150. For example, in the case where the command signal stored in the CA buffer 130 corresponds to a write command (i.e., in the case where the command received from the memory controller 11 is the write command), the control logic circuit 160 may control the operation of the sense amplifier and write driver 170 (i.e., may activate the write driver) based on the decoding result of the command decoder 150 such that the data "DATA" received through the input/output circuit 180 are written in the memory cell array 120. Alternatively, in the case where the command signal stored in the CA buffer 130 corresponds to a read command (i.e., in the case where the command received from the memory controller 11 is the read command), the control logic circuit 160 may control the operation of the sense amplifier and write driver 170 (i.e., may activate the sense amplifier) based on the decoding result of the command decoder 150 such that the data stored in the memory cell array 120 are read out.

Under control of the control logic circuit 160, the sense amplifier and write driver 170 may read the data from the memory cell array 120 through the plurality of bit lines or may write the data in the memory cell array 120 through the plurality of bit lines.

Through the data signal DQ and the data strobe signal DQS, the input/output circuit 180 may receive the data from the memory controller 11 or may transmit the data to the memory controller 11. In an embodiment, the input/output circuit 180 may include a data signal (DQ) driver configured to receive the data signal DQ through a data line or to drive the data signal DQ.

The ZQ controller 110 may be configured to perform the ZQ calibration operation under control of the control logic circuit 160. For example, the ZQ controller 110 may perform the ZQ calibration operation based on a resistor RZQ, and may generate a pull-up code CODE_PU and a pull-down code CODE_PD associated with the driver included in the input/output circuit 180. For example, the resistor RZQ may be an external resistor. In an embodiment, the ZQ controller 110 may receive a signal from the control logic circuit 160, and based on the resistor RZQ and the signal received from the control logic circuit 160, the ZQ controller 110 may generate a pull-up code CODE_PU and a pull-down code CODE_PD associated with the driver included in the input/output circuit 180. An operation of the ZQ controller 110 will be described in detail with reference to the following drawings.

Figure 3:
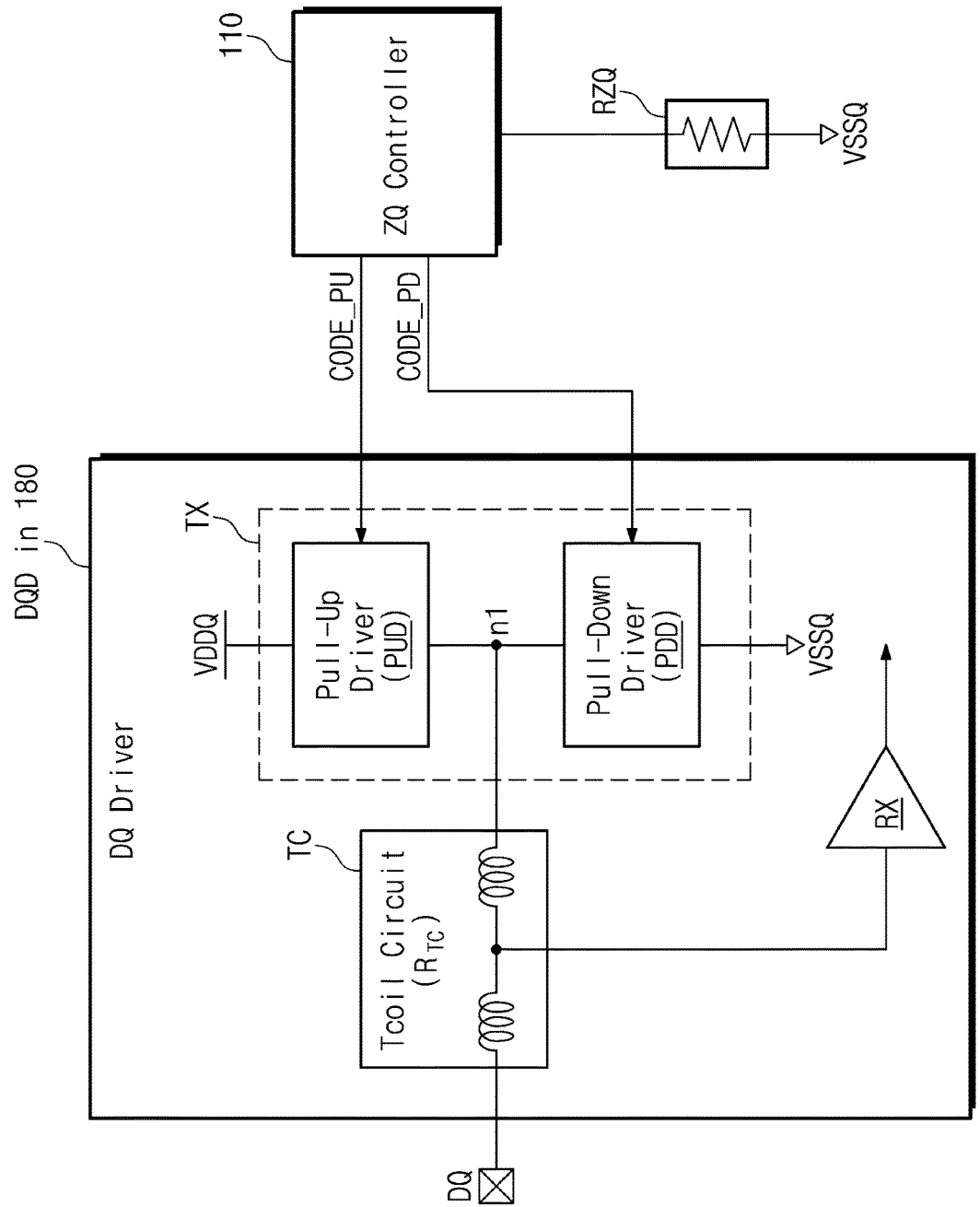
FIG. 3 is a diagram for describing an operation of a ZQ controller of FIG. 2.

FIG. 3 is a diagram for describing an operation of a ZQ controller of FIG. 2. For convenience of description, an operation of the ZQ controller 110 will be described with respect to a driver DQD configured to drive one data signal DQ. However, the disclosure is not limited thereto. For example, the input/output circuit 180 of the memory device 100 may further include a plurality of drivers (DQDs) configured to control a plurality of data signals, respectively. According to an embodiment, each of the plurality of drivers may operate based on the pull-up code CODE_PU and the pull-down code CODE_PD generated by the ZQ controller 110.

Referring to FIGS. 2 and 3, the input/output circuit 180 may include the driver DQD connected to a DQ pad configured to transmit/receive the data signal DQ. The driver DQD may include a transmitter TX, a receiver RX, and a T-coil circuit TC. The driver DQD may be configured to receive the data signal DQ through the DQ pad or output/drive the data signal DQ through the DQ pad. For convenience of description, components and connections between the DQD (in input circuit 180) and S/A and W/D 170 may be omitted in FIGS. 2 and 3.

The transmitter TX may be configured to drive the data signal DQ to be output through the DQ pad. For example, the transmitter TX may include a pull-up driver PUD and a pull-down driver PDD. The pull-up driver PUD may be connected between a power supply voltage VDDQ and a first node n1, and the pull-down driver PDD may be connected between the first node n1 and a ground voltage VSSQ. When the data signal DQ output through the DQ pad is at the high level, the pull-up driver PUD may be activated, and when the data signal DQ output through the DQ pad is at the low level, the pull-down driver PDD may be activated. The receiver RX may sample and output the data signal DQ received through the DQ pad.

In an embodiment, the T-coil circuit TC may be connected between the DQ pad and the first node n1 of the transmitter TX. The T-coil circuit TC may be configured to cancel out an input/output capacitance. For example, the transmitter TX may include a parasitic capacitance, which increases the input/output capacitance. The parasitic capacitance may limit high-speed driving of the data signal DQ. The input/output capacitance of the driver DQD may be cancelled out or reduced by the T-coil circuit TC connected between the DQ pad and the first node n1 of the transmitter TX. Accordingly, the T-coil circuit TC may allow the data signal DQ to be input/output at high speed.

The ZQ controller 110 may generate the pull-up code CODE_PU of the pull-up driver PUD in the transmitter TX and the pull-down code CODE_PD of the pull-down driver PDD in the transmitter TX through the ZQ calibration operation. In an embodiment, the T-coil circuit TC included in the driver DQD may be expressed by a resistance $R_{TC}$. The resistance $R_{TC}$ of the T-coil circuit TC may affect the signal reliability of the driver DQD (i.e., the occurrence of impedance mismatching).

In this case, the ZQ controller 110 may minimize the impedance mismatching due to the resistance $R_{TC}$ of the T-coil circuit TC by performing the ZQ calibration operation by applying the resistance $R_{TC}$ of the T-coil circuit TC based on a ZQ calibration mode. For example, in a first mode, the ZQ controller 110 may perform the first ZQ calibration operation through a first path in which the resistance $R_{TC}$ of the T-coil circuit TC is included. In a second mode, the ZQ controller 110 may perform the second ZQ calibration operation through a second path in which the resistance $R_{TC}$ of the T-coil circuit TC is not included.

In an embodiment, results of the first and second ZQ calibration operations (may change depending on whether the resistance $R_{TC}$ of the T-coil circuit TC is included or not. For example, the pull-up and pull-down codes generated based on the first and second ZQ calibration operations may change depending on whether the resistance $R_{TC}$ of the T-coil circuit TC is included or not. That is, the ZQ calibration mode may be selected based on a communication environment or a reference resistance and a target resistance of the data signal DQ, such as the signal reliability is improved. For example, the ZQ calibration mode may be selected such that the resistance $R_{TC}$ of the T-coil circuit TC is minimized. In an embodiment, the ZQ calibration mode may be selected or determined by the control logic circuit 160 of the memory device 100. Alternatively, the ZQ calibration mode may be selected or determined by the memory controller 11 and may be set to the memory device 100 through a mode register set. However, the disclosure is not limited thereto, and as such, the ZQ calibration mode may be selected or configured in a different manner.

In an embodiment, for convenience of description, the terms "reference resistance" and "target resistance" are used. The reference resistance may refer to a resistance value that is set to a pull-up driver in the ZQ calibration operation. For example, in the ZQ calibration operation, the reference resistance may have a resistance value of 60Ω when the pull-up driver uses four pull-up circuits, the pull-up circuits and an external resistor has a resistance value of 240Ω, and a pull-up reference voltage VREF_PU is 0.8 times the power supply voltage VDDQ (i.e., 0.8*VDDQ). The reference resistance may be variously changed and modified depending on a ZQ calibration operation manner or a setting value. The target resistance may refer to a resistance value that is set to the driver DQD when the memory device 100 is actually driven after the ZQ calibration operation. For example, in an ideal case, the pull-up code may be set through the ZQ calibration operation such that each of the pull-up circuits included in the pull-up driver PUD has a resistance value of 240Ω. According to the above description, when the target resistance has a resistance value of 240Ω, one pull-up circuit among the pull-up circuits may be activated, and when the target resistance has a resistance value of 60Ω, four pull-up circuits among the pull-up circuits may be activated. The target resistance may be variously changed or modified depending on the driving environment of the memory device 100. In an embodiment, the target resistance may be set/designated by the memory controller 11. In an embodiment, information about the target resistance may be stored in the mode register of the memory device 100.

Figure 4:
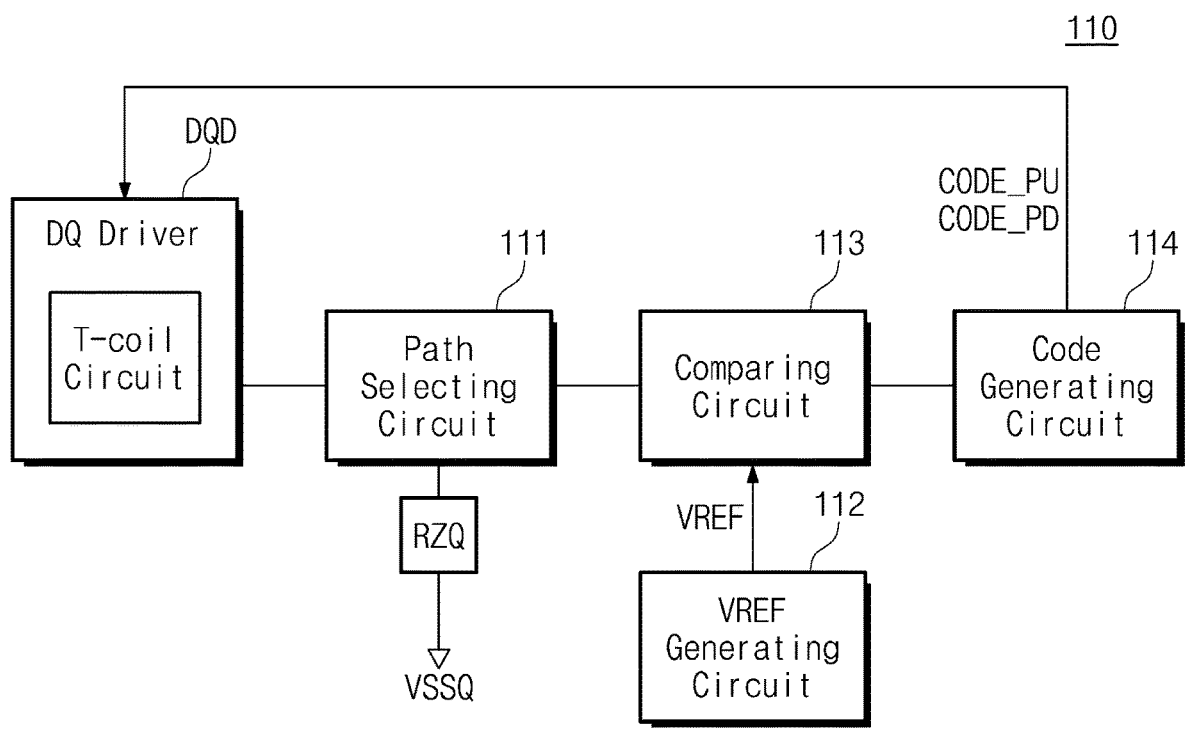
FIG. 4 is a block diagram illustrating a configuration of a ZQ controller of FIG. 3.

FIG. 4 is a block diagram illustrating a configuration of a ZQ controller of FIG. 3. Referring to FIGS. 3 and 4, the ZQ controller 110 may include a path selecting circuit 111, a reference voltage generating circuit 112, a comparing circuit 113, and a code generating circuit 114. However, the disclosure is not limited thereto, and as such, according to another embodiment one or more of the components illustrated in FIG. 4 may be omitted or combined with another component without deviating from the disclosure. Moreover, according to another embodiment, additional components may be included in the ZQ controller illustrated in FIG. 4.

The path selecting circuit 111 may be configured to select a path in which the ZQ calibration operation is to be performed, based on the ZQ calibration mode. For example, when the ZQ calibration mode is the first mode, the path selecting circuit 111 may select a first path in which the resistance $R_{TC}$ of the T-coil circuit TC is included and may output the output voltage. Alternatively, when the ZQ calibration mode is the second mode, the path selecting circuit 111 may select a second path in which the resistance $R_{TC}$ of the T-coil circuit TC is not included and may output the output voltage.

The reference voltage generating circuit 112 may be configured to generate a reference voltage VREF. In an embodiment, the reference voltage VREF may be determined based on the reference resistance of the pull-up driver PUD and the pull-down driver PDD. The reference resistance may refer to the resistance value of the pull-up driver PUD and the pull-down driver PDD, which is set through the ZQ calibration operation. That is, in an ideal case, the pull-up driver PUD may have the resistance value of the reference resistance through the pull-up code CODE_PU generated through the ZQ calibration operation. In an embodiment, when the external resistor RZQ has a resistance value of 240Ω and the reference resistance of the pull-up driver PUD has a resistance value of 60Ω, the reference voltage VREF may be 0.8 times the power supply voltage VDDQ (i.e., 0.8*VDDQ). However, the disclosure is not limited thereto.

The comparing circuit 113 may compare the output voltage of the path selecting circuit 111 and the reference voltage VREF and may output the comparison result.

The code generating circuit 114 may generate the pull-up code CODE_PU and the pull-down code CODE_PD based on the comparison result of the comparing circuit 113. In an embodiment, the code generating circuit 114 may generate the pull-up code CODE_PU and the pull-down code CODE_PD such that the output voltage of the path selecting circuit 111 is identical to the reference voltage VREF.

The impedances of the pull-up driver PUD and the pull-down driver PDD may be adjusted through the above operation of the ZQ controller 110 such that the impedance mismatching of the driver DQD decreases.

Figure 5:
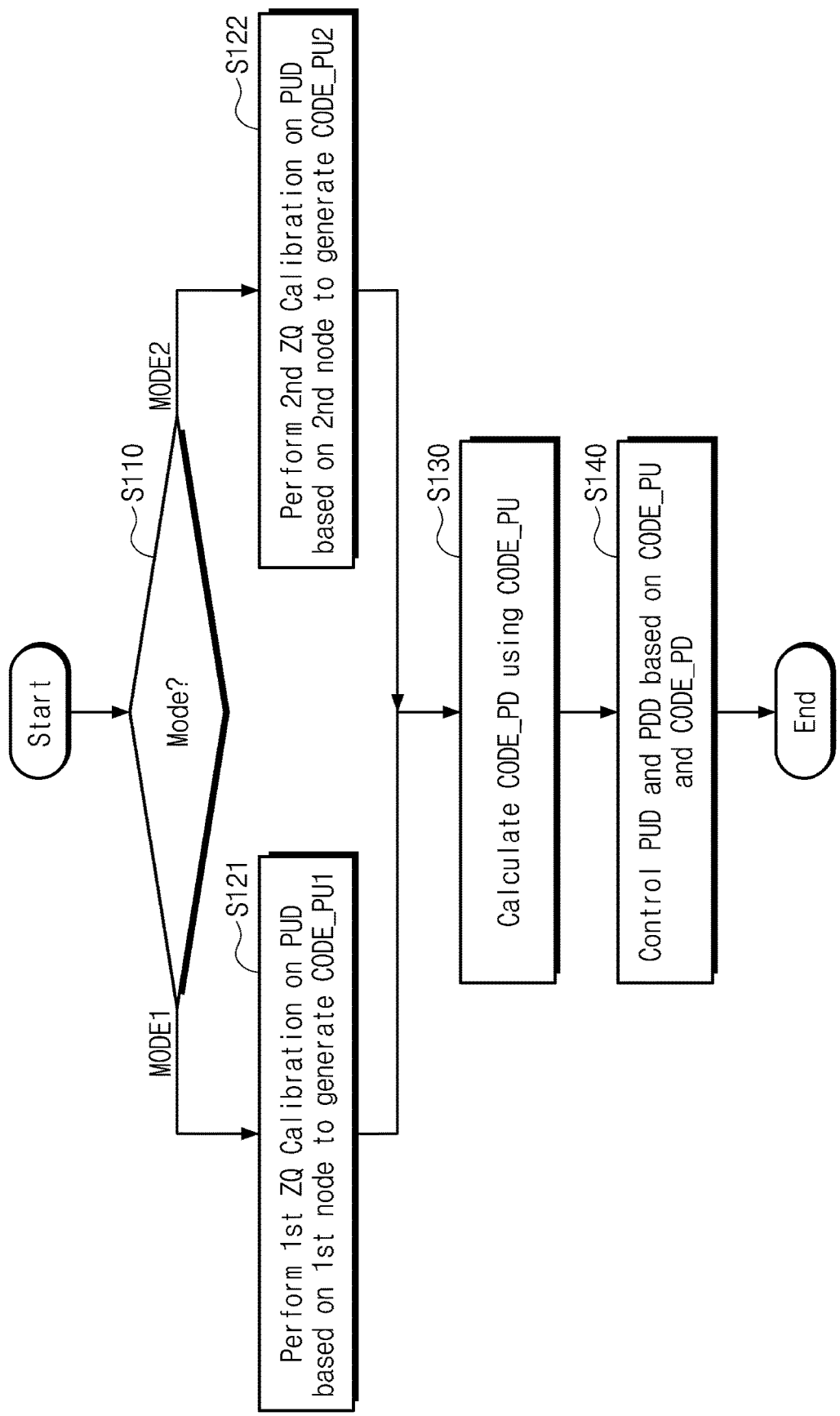
FIG. 5 is a flowchart illustrating an operation of a ZQ controller of FIG. 3.

FIG. 5 is a flowchart illustrating an operation of a ZQ controller of FIG. 3. Referring to FIGS. 3 to 5, in operation S110, the ZQ controller 110 may determine the ZQ calibration mode. For example, as described above, whether the resistance RTC of the T-coil circuit TC is included may be determined depending on the ZQ calibration mode.

When the ZQ calibration mode is the first mode, in operation S121, the ZQ controller 110 may generate a first pull-up code CODE_PU1 by performing a first ZQ calibration operation on the pull-up driver PUD based on a voltage at the first node n1. For example, in the ZQ calibration operation, the path selecting circuit 111 of the ZQ controller 110 may connect the external resistor RZQ with the DQ pad (or a second node). In this case, the pull-up driver PUD, the T-coil circuit TC, and the external resistor RZQ may be connected in series between the power supply voltage VDDQ and the ground voltage VSSQ. The first node n1 may indicate a node between the pull-up driver PUD and the T-coil circuit TC. That is, when the ZQ calibration mode is the first mode, the resistance $R_{TC}$ of the T-coil circuit TC may not be included in the pull-up driver PUD, but it may be included in the external resistor RZQ. Under the above state (or condition), the ZQ calibration operation may be performed on the pull-up driver PUD.

When the ZQ calibration mode is the second mode, in operation S122, the ZQ controller 110 may generate a second pull-up code CODE_PU2 by performing a second ZQ calibration operation on the pull-up driver PUD based on the second node. For example, in the ZQ calibration operation, the path selecting circuit 111 of the ZQ controller 110 may connect the external resistor RZQ with the DQ pad (or a second node n2 (refer to FIG. 6)). In this case, the pull-up driver PUD, the T-coil circuit TC, and the external resistor RZQ may be connected in series between the power supply voltage VDDQ and the ground voltage VSSQ. The second node n2 may indicate a node between the T-coil circuit TC and the external resistor RZQ. That is, when the ZQ calibration mode is the second mode, the ZQ calibration operation may be performed on the pull-up driver PUD in a state where the resistance $R_{TC}$ of the T-coil circuit TC is included in the pull-up driver PUD.

In operation S130, the ZQ controller 110 may calculate the pull-down code CODE_PD of the pull-down driver PDD by using the pull-up code CODE_PU (e.g., CODE_PU1 or CODE_PU2). For example, after operation S121 or operation S122 is completed, the ZQ controller 110 may perform the ZQ calibration operation on the pull-down driver PDD. In this case, the pull-up driver PUD and the pull-down driver PDD are connected in series between the power supply voltage VDDQ and the ground voltage VSSQ. The ZQ controller 110 may provide the pull-up driver PUD with the pull-up code (e.g., CODE_PU1 or CODE_PU2) generated in operation S121 or operation S122 and may calculate the pull-down code CODE_PD of the pull-down driver PDD.

In operation S140, the ZQ controller 110 may control the pull-up driver PUD and the pull-down driver PDD based on the pull-up code CODE_PU and the pull-down code CODE_PD.

In an embodiment, as described above, the ZQ controller 110 may perform the ZQ calibration operation based on the ZQ calibration mode, that is, in a state where the resistance $R_{TC}$ of the T-coil circuit TC is included or in a state where the resistance $R_{TC}$ of the T-coil circuit TC is not included. Accordingly, a result of the ZQ calibration operation may change depending on each state. However, the offset of the resistance $R_{TC}$ of the T-coil circuit TC according to the result of the ZQ calibration operation may change depending on the reference resistance of the ZQ calibration operation and the target resistance of the driver. In other words, the T-coil offset may change depending on the ZQ calibration mode, the reference resistance, and the target resistance. According to an embodiment of the disclosure, the ZQ calibration mode may be selected such that the T-coil offset is minimized, and the ZQ controller 110 may perform the ZQ calibration operation based on the selected ZQ calibration mode.

In an embodiment, the ZQ calibration mode may be selected or determined by the control logic circuit 160 of the memory device 100, based on the reference resistance or the target resistance. Alternatively, the ZQ calibration mode may be selected or determined by the memory controller 11, based on the reference resistance or the target resistance.

Figure 6:
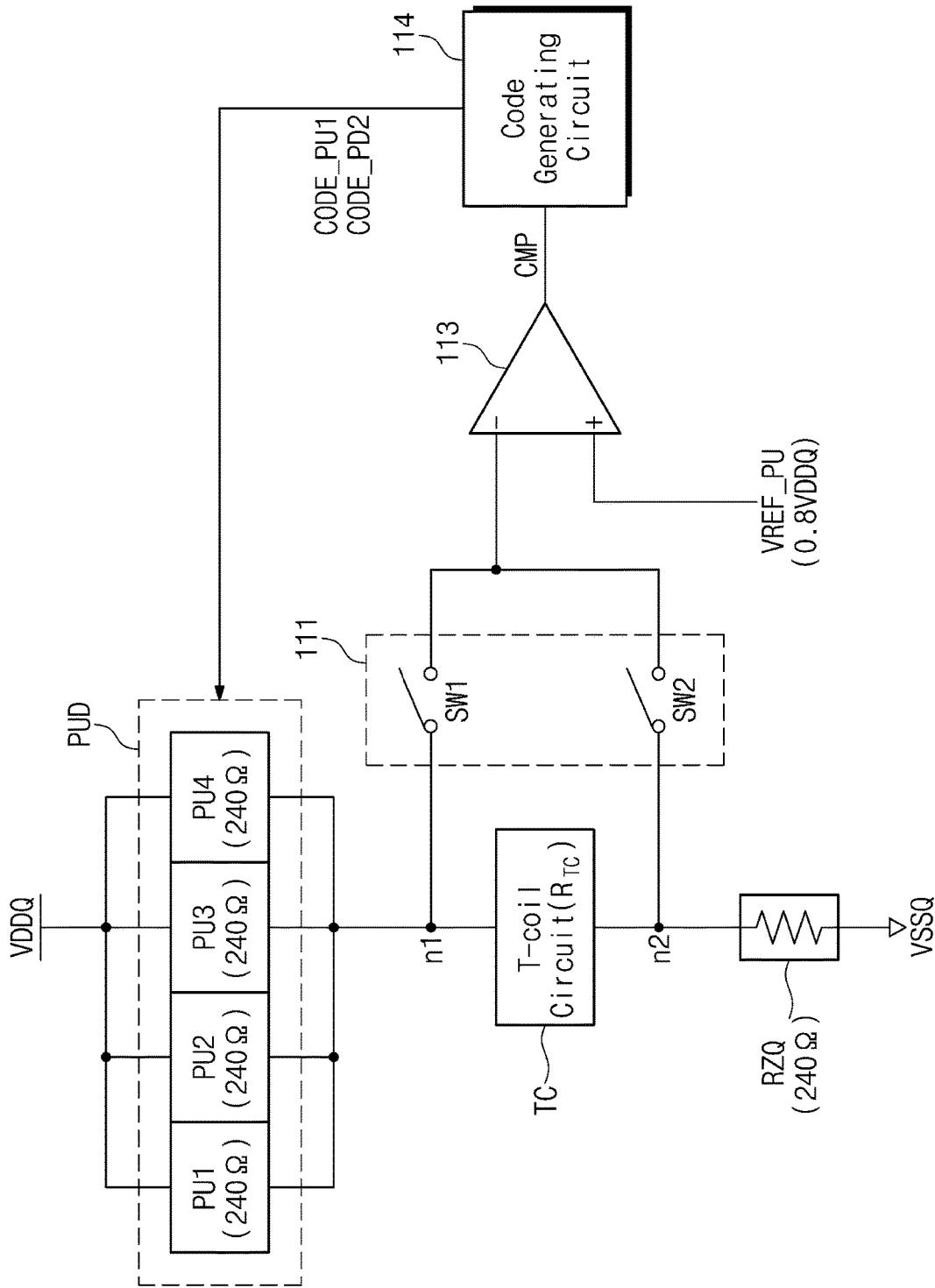
FIGS. 6 to 8 are diagrams for describing a ZQ calibration operation which a ZQ controller of FIG. 4 performs on a pull-up driver.
Figure 7:
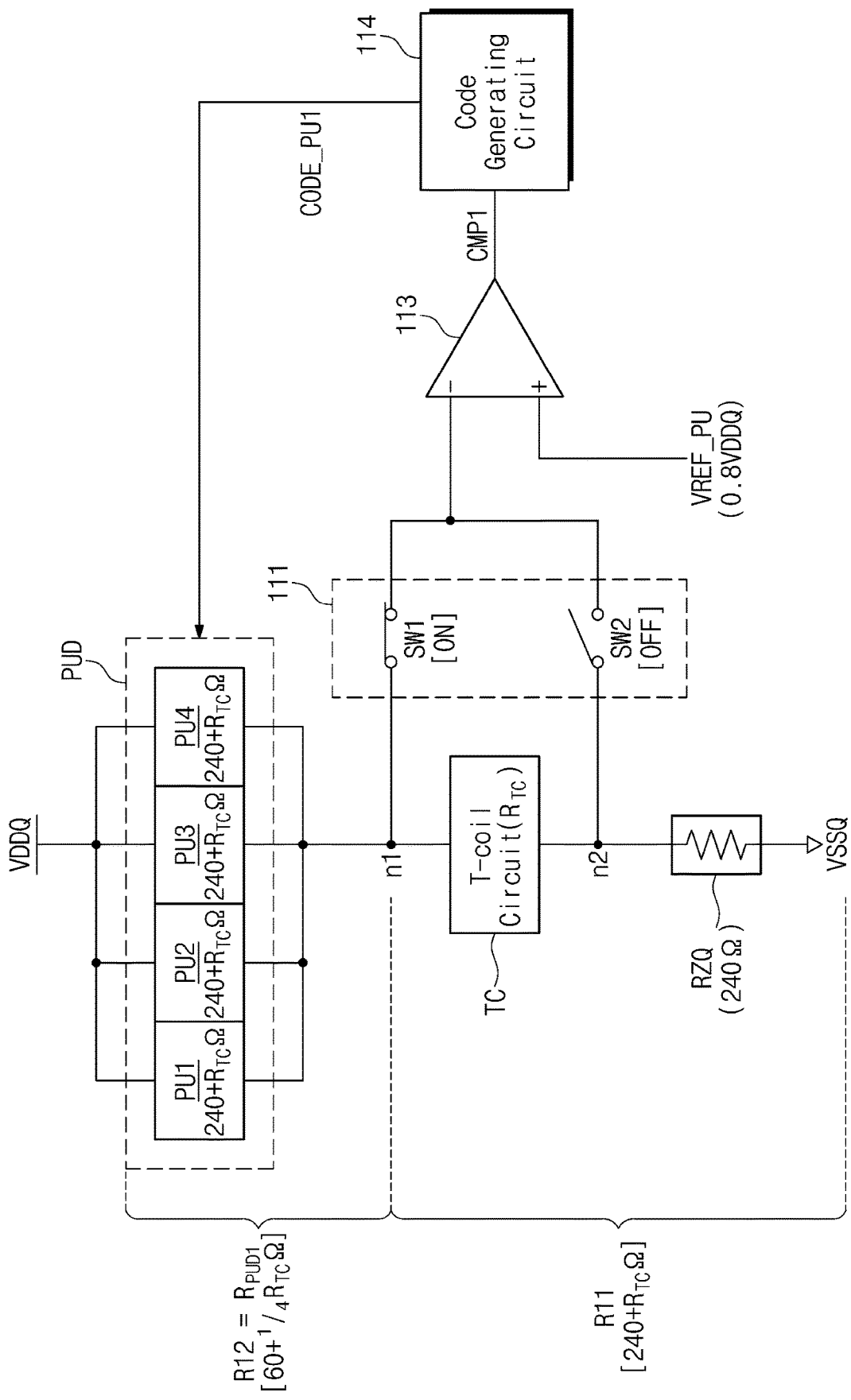
Figure 8:
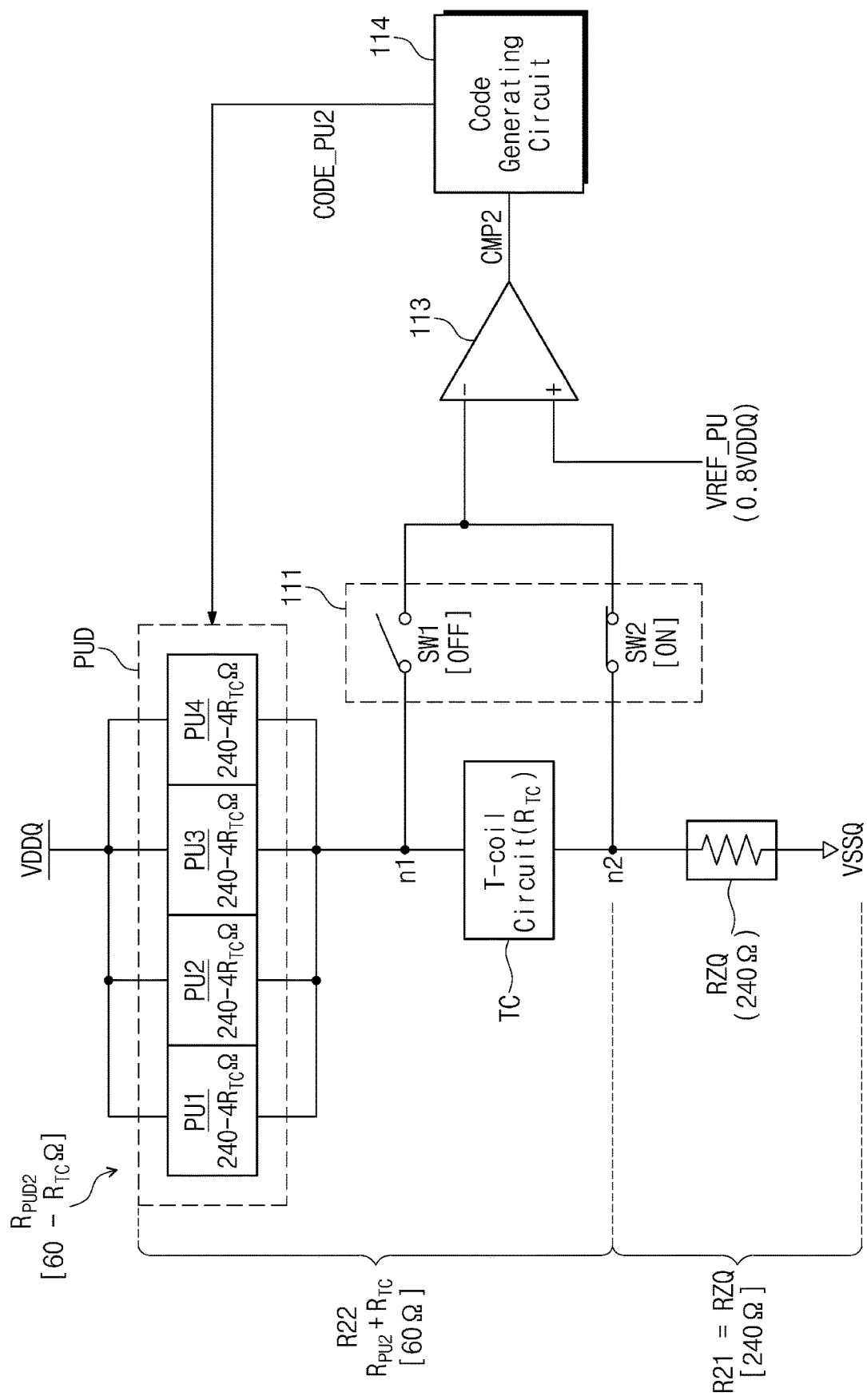

FIGS. 6 to 8 are diagrams for describing a ZQ calibration operation performed on a pull-up driver by a ZQ controller of FIG. 4. FIGS. 9A and 9B are diagrams for describing an effect according to a ZQ calibration operation performed on a pull-up driver by a ZQ controller of FIG. 4. For convenience of description, details about the ZQ calibration operation performed on the pull-up driver PUD of the driver DQD will be described with reference to FIGS. 6 to 8. Also, it is assumed that the external resistor RZQ has a resistance value of 240Ω and the reference resistance for the pull-up driver PUD has a resistance value of 60Ω. That is, in an ideal case, the pull-up code CODE_PU may be generated through the ZQ calibration operation of the pull-up driver PUD such that the pull-up driver PUD has a resistance value of 60Ω. However, the disclosure is not limited thereto. For example, a drive scheme of the ZQ controller 110 may be variously changed and modified. That is, the external resistor RZQ may have a resistance value different than 240Ω and the reference resistance for the pull-up driver PUD may be different than a resistance value of 60Ω

Referring to FIGS. 2 to 8, in the ZQ calibration operation for the pull-up driver PUD, the external resistor RZQ may be connected to the second node n2 by the path selecting circuit 111 of the ZQ controller 110. In an embodiment, the second node n2 may correspond to one end of the T-coil circuit TC. Alternatively, the second node n2 may correspond to the DQ pad configured to receive the data signal DQ.

The pull-up driver PUD may include a plurality of pull-up circuits PU1, PU2, PU3, and PU4. Each of the plurality of pull-up circuits PU1, PU2, PU3, and PU4 may refer to a circuit configured to operate based on the pull-up code CODE_PU. For example, each of the plurality of pull-up circuits PU1, PU2, PU3, and PU4 may operate in response to the pull-up code CODE_PU output by the code generating circuit 114. In an embodiment, each of the plurality of pull-up circuits PU1, PU2, PU3, and PU4 may be implemented with a pull-up leg having a resistance value of 240Ω. In an embodiment, the resistance value of each of the plurality of pull-up circuits PU1, PU2, PU3, and PU4 may be adjusted depending on a code value of the pull-up code CODE_PU. Although FIGS. 6-8 illustrate a pull-up driver PUD including four pull-up circuits PU1, PU2, PU3, and PU4, the disclosure is not limited thereto, and as such, according to another embodiment, the number of pull-up circuits included in the pull-up driver PUD may be less than four or greater than four.

The path selecting circuit 111 may include a first switch SW1 and a second switch SW2. The first switch SW1 may be connected between the first node n1 and the inverting input terminal (−) of the comparing circuit 113, and the second switch SW2 may be connected between the second node n2 and the inverting input terminal (−) of the comparing circuit 113. When the first switch SW1 is turned on, the voltage of the first node n1 may be provided to the inverting input terminal (−) of the comparing circuit 113, and when the second switch SW2 is turned on, the voltage of the second node n2 may be provided to the inverting input terminal (−) of the comparing circuit 113. The path selecting circuit 111 may selectively turn on one of the first and second switches SW1 and SW2, based on the ZQ calibration mode. For example, based on the ZQ calibration mode being a first mode, the path selecting circuit 111 may selectively turn on the first switch SW1, and based on the ZQ calibration mode being a second mode, the path selecting circuit 111 may selectively turn on the second switch SW2.

The comparing circuit 113 may compare the output voltage of the path selecting circuit 111 (i.e., the voltage of the first node n1 or the voltage of the second node n2) with the pull-up reference voltage VREF_PU. In an embodiment, when the external resistor RZQ has a resistance value of 240Ω and the reference resistance of the pull-up driver PUD has a resistance value of 60Ω, the pull-up reference voltage VREF_PU may be 0.8 times the power supply voltage VDDQ (i.e., 0.8*VDDQ). The comparing circuit 113 may output a comparison result CMP based on the comparison result.

The code generating circuit 114 may generate the pull-up code CODE_PU1 or CODE_PU2 based on the comparison result CMP of the comparing circuit 113. For example, when the comparison result CMP indicates that the pull-up reference voltage VREF_PU is lower than the output voltage of the path selecting circuit 111, the code generating circuit 114 may decrease the code value of the pull-up code CODE_PU1 or CODE_PU2. (i.e., such that the resistance of the pull-up driver PUD decreases). When the comparison result CMP indicates that the pull-up reference voltage VREF_PU is higher than the output voltage of the path selecting circuit 111, the code generating circuit 114 may increase the code value of the pull-up code CODE_PU1 or CODE_PU2. (i.e., such that the resistance of the pull-up driver PUD increases).

Through the above operation, the ZQ controller 110 may generate the pull-up code CODE_PU1 or CODE_PU2 by performing the ZQ calibration operation on the pull-up driver PUD.

For example, when the ZQ calibration mode is the first mode, the path selecting circuit 111 may turn on the first switch SW1, and thus, the voltage of the first node n1 is provided to the inverting input terminal (−) of the comparing circuit 113. In this case, the code generating circuit 114 may generate the first pull-up code CODE_PU1. When the ZQ calibration mode is the second mode, the path selecting circuit 111 may turn on the second switch SW2, and thus, the voltage of the second node n2 is provided to the inverting input terminal (−) of the comparing circuit 113. In this case, the code generating circuit 114 may generate the second pull-up code CODE_PU2. That is, the actual resistance of the pull-up driver PUD may change depending on the ZQ calibration mode (or whether any node is selected by the path selecting circuit 111).

For example, as illustrated in FIG. 7, the path selecting circuit 111 may turn on the first switch SW1. In this case, the voltage of the first node n1 may be provided to the inverting input terminal of the comparing circuit 113, and the comparing circuit 113 may output a first comparison result CMP1 by comparing the voltage of the first node n1 and the pull-up reference voltage VREF_PU. The code generating circuit 114 may generate the first pull-up code CODE_PU1 based on the first comparison result CMP1. The pull-up driver PUD may operate based on the first pull-up code CODE_PU1.

In this case, the first pull-up code CODE_PU1 may be generated based on a voltage at the first node n1 such that a resistance value (R12) is ¼ times a resistance value (R11) between the first node n1 and the ground voltage VSSQ. The reason the resistance value (R12) is ¼ times the resistance value (R11) is because the pull-up reference voltage VREF_PU is 0.8*VDDQ. The resistance value R11 may be expressed by a sum (i.e., (240+$R_{TC}$)Ω) of resistance values of the external resistor RZQ (240Ω) and the resistance $R_{TC}$ of the T-coil circuit TC ($R_{TC}$Ω).

The resistance value R12 may refer to a resistance value between the power supply voltage VDDQ and the first node n1, which corresponds to a first resistance value $RPUD_1$ of the pull-up driver PUD. Because the resistance value R11 is (240+$R_{TC}$)Ω, the first pull-up code CODE_PU1 may be generated such that the resistance value R12 (i.e., the first resistance value $RPUD_1$ of the pull-up driver PUD) has a value of (60+¼*$R_{TC}$)Ω.

Because the pull-up driver PUD includes the four pull-up circuits PU1, PU2, PU3, and PU4 connected in parallel, each of the four pull-up circuits PU1, PU2, PU3, and PU4 may be driven by the first pull-up code CODE_PU1 so as to have a resistance value of (240+$R_{TC}$)Ω.

Next, as illustrated in FIG. 8, the path selecting circuit 111 may turn on the second switch SW2. In this case, the voltage of the second node n2 may be provided to the inverting input terminal of the comparing circuit 113, and the comparing circuit 113 may output a second comparison result CMP2 by comparing the voltage of the second node n2 and the pull-up reference voltage VREF_PU. The code generating circuit 114 may generate the second pull-up code CODE_PU2 based on the second comparison result CMP2. The pull-up driver PUD may operate based on the second pull-up code CODE_PU2.

In this case, the second pull-up code CODE_PU2 may be generated based on a voltage at the second node n2 such that a resistance value R22 is ¼ times a resistance value R21 between the second node n2 and the ground voltage VSSQ, which is expressed by the resistance value (i.e., 240Ω) of the external resistor RZQ. The reason the resistance value R22 is ¼ times the resistance value R21 is because the pull-up reference voltage VREF_PU is 0.8*VDDQ.

The resistance value R22 may refer to a resistance value between the power supply voltage VDDQ and the second node n2, which is expressed by a sum (i.e., ($R_{PUD2}$+$R_{TC}$)Ω) of a second resistance value $RPUD_2$ of the pull-up driver PUD and a resistance value of the resistance $R_{TC}$ of the T-coil circuit TC. Because the resistance value R21 is 240Ω, the second pull-up code CODE_PU2 may be generated such that the resistance value R22 has 60Ω. In this case, the second resistance value $RPUD_2$ of the pull-up driver PUD may have a resistance value of (60−$R_{TC}$)Ω by the second pull-up code CODE_PU2.

Because the pull-up driver PUD includes the four pull-up circuits PU1, PU2, PU3, and PU4 connected in parallel, each of the four pull-up circuits PU1, PU2, PU3, and PU4 may be driven by the second pull-up code CODE_PU2 so as to have a resistance value of (240−4$R_{TC}$)Ω.

As described above, the actual resistance of the pull-up driver PUD may change depending on the ZQ calibration mode (i.e., whether any node is selected by the path selecting circuit 111). The influence (i.e., the degree of impedance mismatch) by the resistance $R_{TC}$ of the T-coil circuit TC may vary depending on a difference between the resistance values of the pull-up driver PUD. Accordingly, one of the first and second modes may be selected as the ZQ calibration mode such that the influence by the resistance $R_{TC}$ of the T-coil circuit TC decreases.

For example, FIG. 9A shows a result of performing the first ZQ calibration operation in the first mode (i.e., when the first node n1 is selected by the path selecting circuit 111), under the condition that the reference resistance is set to 60Ω (i.e., four pull-up circuits each having a resistance value of 240Ω are used and the pull-up reference voltage VREF_PU is set to 0.8*VDDQ). FIG. 9B shows a result of performing the second ZQ calibration operation in the second mode (i.e., when the second node n2 is selected by the path selecting circuit 111), under the condition that the reference resistance is set to 60Ω (i.e., four pull-up circuits each having a resistance value of 240Ω are used and the pull-up reference voltage VREF_PU is set to 0.8*VDDQ).

First, as illustrated in FIG. 9A, the pull-up driver PUD may operate based on the first pull-up code CODE_PU1. The target resistance of the pull-up driver PUD may change depending on the operation state of the memory device 100. For example, when the target resistance of the pull-up driver PUD is set to have a resistance value of 240Ω, one of a plurality of pull-up circuits included in the pull-up driver PUD may be activated. In this case, the resistance value of the pull-up driver PUD may be $(240+R_{TC})\Omega$. When the target resistance of the pull-up driver PUD is set to have a resistance value of 120Ω, two of the plurality of pull-up circuits included in the pull-up driver PUD may be activated. In this case, the resistance value of the pull-up driver PUD may be $(120+\frac{1}{2}*R_{TC})\Omega$. Likewise, when the target resistance of the pull-up driver PUD is set to have a resistance value of 60Ω, four of the plurality of pull-up circuits included in the pull-up driver PUD may be activated. In this case, the resistance value of the pull-up driver PUD may be $(60+\frac{1}{4}*R_{TC})\Omega$. When the target resistance of the pull-up driver PUD is set to have a resistance value of 48Ω, five of the plurality of pull-up circuits included in the pull-up driver PUD may be activated. In this case, the resistance value of the pull-up driver PUD may be $(48+\frac{1}{5}*R_{TC})\Omega$. When the target resistance of the pull-up driver PUD is set to have a resistance value of 40Ω, six of the plurality of pull-up circuits included in the pull-up driver PUD may be activated. In this case, the resistance value of the pull-up driver PUD may be $(40+\frac{1}{6}*R_{TC})\Omega$.

In FIG. 9A, the resistance $R_{TC}$ of the T-coil circuit TC may be added when the driver DQD is driven. According to the above description, the actual resistance of the pull-up driver PUD may change as illustrated in FIG. 9A. For example, when the target resistance of the pull-up driver PUD is set to 240Ω, 120Ω, 60Ω, 48Ω, or 40Ω, the resistance of the pull-up driver PUD to which the resistance $R_{TC}$ of the T-coil circuit TC is applied has a value of $(240+2*R_{TC})\Omega$, $(120+3/2*R_{TC})\Omega$, $(60+5/4*R_{TC})\Omega$, $(48+6/5*R_{TC})\Omega$, or $(40+7/6*R_{TC})\Omega$, respectively.

Next, as illustrated in FIG. 9B, the pull-up driver PUD may operate based on the second pull-up code CODE_PU2. The target resistance of the pull-up driver PUD may change depending on the operation state of the memory device 100. For example, when the target resistance of the pull-up driver PUD is set to have a resistance value of 240Ω, one of a plurality of pull-up circuits included in the pull-up driver PUD may be activated. In this case, the resistance value of the pull-up driver PUD may be $(240-4R_{TC})\neq$. When the target resistance of the pull-up driver PUD is set to have a resistance value of 120Ω, two of the plurality of pull-up circuits included in the pull-up driver PUD may be activated. In this case, the resistance value of the pull-up driver PUD may be $(120-2*R_{TC})\Omega$. Likewise, when the target resistance of the pull-up driver PUD is set to have a resistance value of 60Ω, four of the plurality of pull-up circuits included in the pull-up driver PUD may be activated. In this case, the resistance value of the pull-up driver PUD may be $(60-R_{TC})\Omega$. When the target resistance of the pull-up driver PUD is set to have a resistance value of 48Ω, five of the plurality of pull-up circuits included in the pull-up driver PUD may be activated. In this case, the resistance value of the pull-up driver PUD may be $(48-\frac{4}{5}*R_{TC})\Omega$. When the target resistance of the pull-up driver PUD is set to have a resistance value of 40Ω, six of the plurality of pull-up circuits included in the pull-up driver PUD may be activated. In this case, the resistance value of the pull-up driver PUD may be $(40-\frac{2}{3}*R_{TC})\Omega$.

In FIG. 9B, the resistance $R_{TC}$ of the T-coil circuit TC may be added when the driver DQD is driven. According to the above description, the actual resistance of the pull-up driver PUD may change as illustrated in FIG. 9B. For example, when the target resistance of the pull-up driver PUD is set to 240Ω, 120Ω, 60Ω, 48Ω, or 40Ω, the resistance of the pull-up driver PUD to which the resistance $R_{TC}$ of the T-coil circuit TC is applied has a value of $(240-3*R_{TC})\Omega$, $(120-R_{TC})\Omega$, 60Ω, $(48+\frac{1}{5}*R_{TC})\Omega$, or $(40+\frac{1}{3}*R_{TC})\Omega$, respectively.

As illustrated in FIGS. 9A and 9B, the offset by the resistance $R_{TC}$ of the T-coil circuit TC may change depending on the ZQ calibration mode, the reference resistance, and the target resistance. For example, when the reference resistance is set to have a resistance value of 60Ω and the target resistance is set to have a resistance value of 60Ω, the offset by the resistance $R_{TC}$ of the T-coil circuit TC may be $(5/4*R_{TC})\Omega$, but the entire resistance $R_{TC}$ of the T-coil circuit TC may be cancelled out by the second pull-up code CODE_PU2. That is, when the reference resistance is set to have a resistance value of 60Ω and the target resistance is set to have a resistance value of 60Ω, the ZQ calibration mode may be set to the second mode, and thus, the impedance mismatching may be minimized.

In contrast, when the reference resistance is set to have a resistance value of 60Ω and the target resistance is set to have a resistance value of 240Ω, the offset of $2*R_{TC}\Omega$ may be caused by the first pull-up code CODE_PU1, and the offset of $-3*R_{TC}\Omega$ may be caused by the second pull-up code CODE_PU2. That is, when the reference resistance is set to have a resistance value of 60Ω and the target resistance is set to have a resistance value of 240Ω, the ZQ calibration mode may be set to the first mode, and thus, the offset of the resistance $R_{TC}$ of the T-coil circuit TC may be minimized through the first pull-up code CODE_PU1.

As described above, the offset by the resistance $R_{TC}$ of the T-coil circuit TC may change depending on the ZQ calibration mode, the reference resistance of the driver DQD, and the target resistance of the driver DQD. Accordingly, the ZQ calibration mode in which the offset by the resistance $R_{TC}$ of the T-coil circuit TC is minimized may be selected based on the reference resistance of the driver DQD and the target resistance of the driver DQD. This may mean that the operation reliability of the memory device 100 is improved.

In the above embodiments, the description is given as the ZQ controller 110 selects one of the first and second nodes n1 and n2 based on the ZQ calibration mode and performs the ZQ calibration operation. However, the disclosure is not limited thereto. For example, in the ZQ calibration operation, the ZQ controller 110 may generate the first pull-up code CODE_PU1 by performing the first ZQ calibration operation based on a voltage at the first node n1 and may generate the second pull-up code CODE_PU2 by performing the second ZQ calibration operation based on a voltage at the second node n2. The first and second pull-up codes CODE_PU1 and CODE_PU2 thus generated may be stored in a ZQ register. Afterwards, when the target resistance of the driver is changed in the driving of the memory device 100 or depending on a set target voltage, one of the first and second pull-up codes CODE_PU1 and CODE_PU2 may be selected, and the driver may be driven based on the selected pull-up code.

Figure 10:
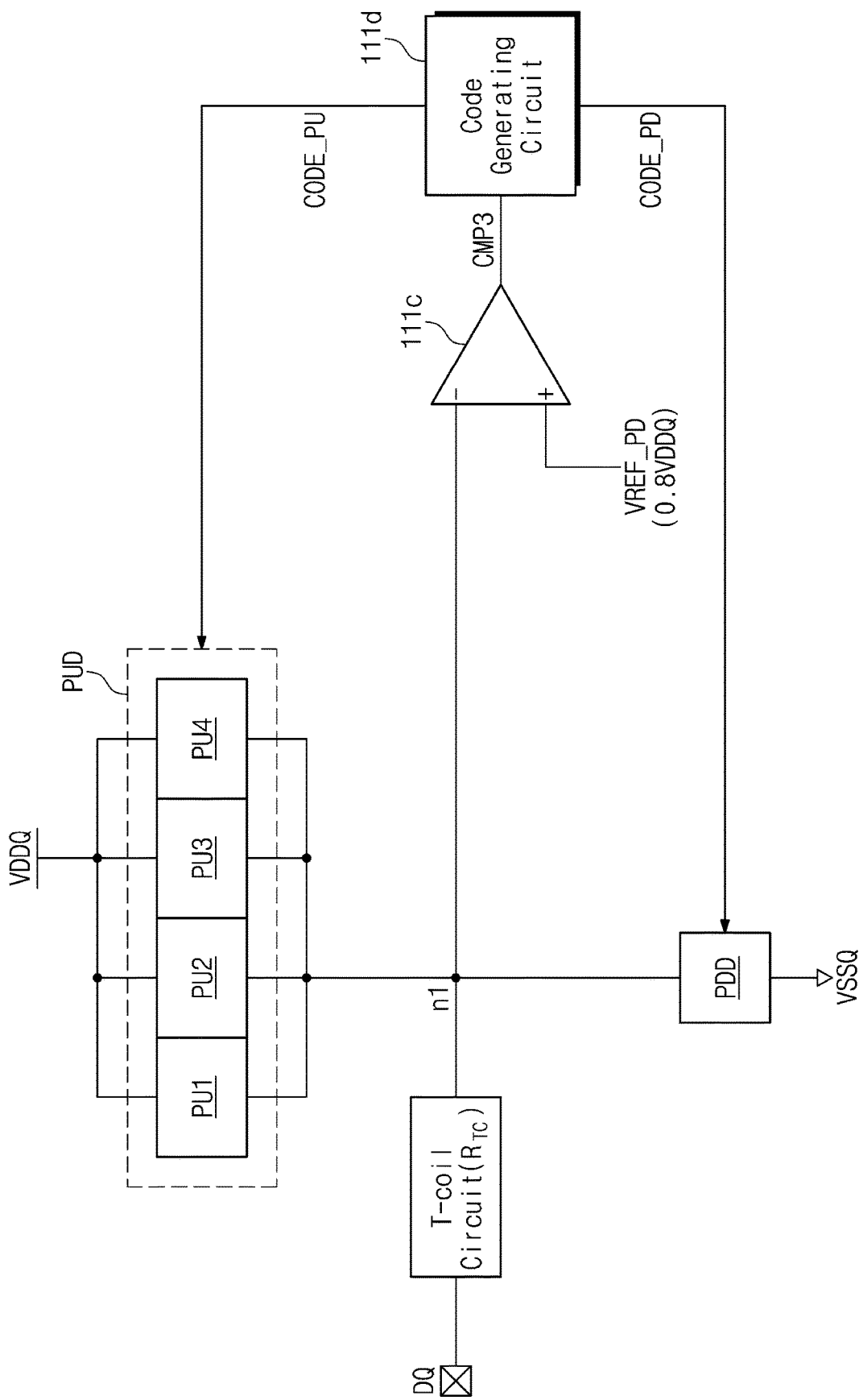
FIG. 10 is a diagram for describing a ZQ calibration operation which a ZQ controller of FIG. 3 performs on a pull-down driver.

FIG. 10 is a diagram for describing a ZQ calibration operation performed on a pull-down driver by a ZQ controller of FIG. 3. Referring to FIGS. 3 and 10, the ZQ controller 110 may perform the ZQ calibration operation on the pull-down driver PDD. For example, when the ZQ calibration operation is performed on the pull-down driver PDD, the pull-up driver PUD and the pull-down driver PDD may be connected in series between the power supply voltage VDDQ and the ground voltage VSSQ.

The pull-up driver PUD may operate based on the pull-up code CODE_PU generated by a code generating unit 111d. In an embodiment, the pull-up code CODE_PU may be one of the first pull-up code CODE_PU1 and the second pull-up code CODE_PU2 described with reference to FIGS. 5 to 9B. In an embodiment, when the pull-up driver PUD operates based on the first pull-up code CODE_PU1, the pull-up driver PUD may have a resistance value of $(60+¼*R_{TC})\Omega$. Alternatively, when the pull-up driver PUD operates based on the second pull-up code CODE_PU2, the pull-up driver PUD may have a resistance value of $(60-R_{TC})\Omega$.

The voltage of the first node n1 between the pull-up driver PUD and the pull-down driver PDD may be provided to the inverting input terminal (−) of a comparing circuit 111c. The comparing circuit 111c may compare the voltage of the first node n1 and a pull-down reference voltage VREF_PD and may output a comparison result CMP3. In an embodiment, the pull-down reference voltage VREF_PD may be 0.8*VDDQ, but the disclosure is not limited thereto.

The code generating circuit 111d may generate or adjust the pull-down code CODE_PD based on the comparison result CMP3. For example, when the comparison result CMP3 indicates that the voltage of the first node n1 is lower than the pull-down reference voltage VREF_PD, the code generating circuit 111d may decrease the code value of the pull-down code CODE_PD. For instance, the code generating circuit 111d may decrease the code value of the pull-down code CODE_PD, such that the resistance of the pull-down code CODE_PD increases. When the comparison result CMP3 indicates that the voltage of the first node n1 is higher than the pull-down reference voltage VREF_PD, the code generating circuit 111d may increase the code value of the pull-down code CODE_PD, such that the resistance of the pull-down code CODE_PD decreases. That is, the code generating circuit 111d may generate the pull-down code CODE_PD such that the resistance of the pull-up driver PUD and the resistance of the pull-down driver PDD have a ratio. The ratio may be a predetermined ratio. For example, the ratio may be ¼ times.

Figure 11:
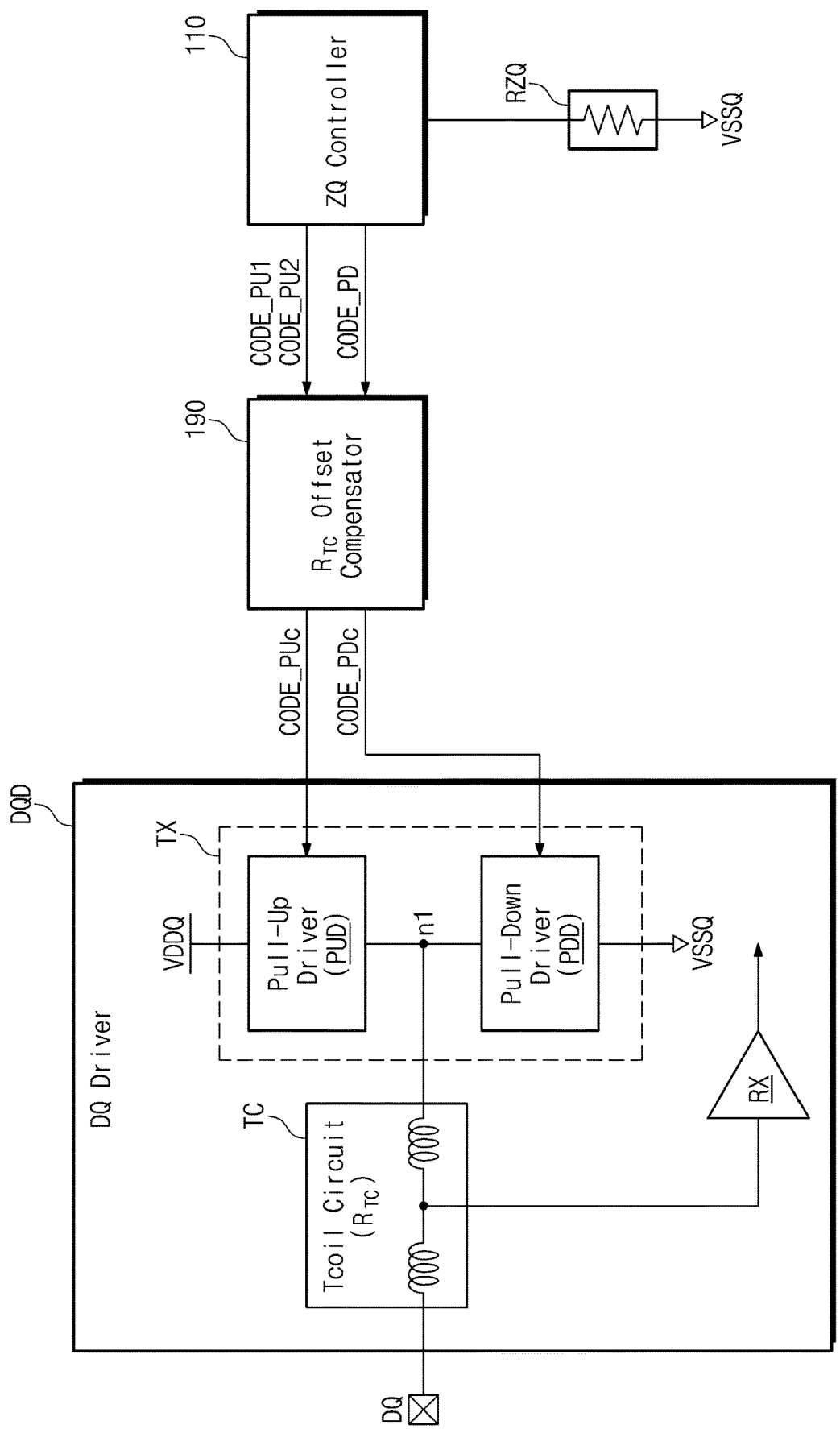
FIG. 11 is a diagram for describing a ZQ calibration operation of a memory device of FIG. 2.

FIG. 11 is a diagram for describing a ZQ calibration operation of a memory device of FIG. 2. For brevity of drawing and for convenience of description, only some of the components of the memory device 100 are illustrated in FIG. 11. However, the disclosure is not limited thereto.

Also, for brevity of drawing and for convenience of description, some of the components of the ZQ controller 110 and a connection relationship thereof are omitted in FIG. 11, but the disclosure is not limited thereto. For example, the ZQ controller 110 may perform the ZQ calibration operation on the driver DQD based on the method described with reference to FIGS. 5 to 9B.

Referring to FIGS. 2 and 11, the driver DQD may include the transmitter TX, the receiver RX, and the T-coil circuit TC. The components of the driver DQD are described above, and thus, additional description will be omitted to avoid redundancy.

The ZQ controller 110 may perform the ZQ calibration operation on the driver DQD. In an embodiment, the ZQ controller 110 may perform the ZQ calibration operation based on the operation method described with reference to FIGS. 6 to 9B. In an embodiment, the ZQ controller 110 may generate the first pull-up code CODE_PU1 by performing the first ZQ calibration operation to which the resistance $R_{TC}$ of the T-coil circuit TC is applied and may generate the second pull-up code CODE_PU2 by performing the second ZQ calibration operation to which the resistance $R_{TC}$ of the T-coil circuit TC is not applied.

The first pull-up code CODE_PU1 and the second pull-up code CODE_PU2 may be provided to an offset comparator 190. The offset comparator 190 may calculate a value of the resistance $R_{TC}$ of the T-coil circuit TC based on the first pull-up code CODE_PU1 and the second pull-up code CODE_PU2. For example, as described with reference to FIGS. 7 and 8, the first pull-up code CODE_PU1 may be obtained through the first ZQ calibration operation to which the resistance $R_{TC}$ of the T-coil circuit TC is applied, and the second pull-up code CODE_PU2 may be obtained through the second ZQ calibration operation to which the resistance $R_{TC}$ of the T-coil circuit TC is not applied. In this case, the pull-up driver PUD may have a resistance value of $(60+¼*R_{TC})\Omega$ by the first pull-up code CODE_PU1. Because the pull-up driver PUD includes the four pull-up circuits PU1, PU2, PU3, and PU4 and each of the four pull-up circuits PU1, PU2, PU3, and PU4 operate in response to the first pull-up code CODE_PU1, the first pull-up code CODE_PU1 may correspond to a resistance value of $(240+R_{TC})\Omega$.

The pull-up driver PUD may have a resistance value of $(60-R_{TC})\Omega$ by the second pull-up code CODE_PU2. Because the pull-up driver PUD includes the four pull-up circuits PU1, PU2, PU3, and PU4 and each of the four pull-up circuits PU1, PU2, PU3, and PU4 operates in response the second pull-up code CODE_PU2, the second pull-up code CODE_PU2 may correspond to a resistance value of $(240-4*R_{TC})\Omega$.

As described above, a code value difference of the first pull-up code CODE_PU1 and the second pull-up code CODE_PU2 corresponds to a resistance value difference of $5*R_{TC}$. Accordingly, the offset comparator 190 may detect a code value corresponding to the resistance $R_{TC}$ of the T-coil circuit TC, based on the code value difference of the first pull-up code CODE_PU1 and the second pull-up code CODE_PU2.

The offset comparator 190 may compensate for the offset by the resistance $R_{TC}$ of the T-coil circuit TC based on the detected code value. For example, when the target resistance of the driver DQD is set to have a resistance value of 40Ω, the pull-up code CODE_PU may be compensated such that the pull-up code CODE_PU corresponds to a resistance value of $(40-R_{TC})\Omega$, which is a result of subtracting a resistance value of the resistance $R_{TC}$ of the T-coil circuit TC from the resistance value of the target resistance. In this case, the pull-up code CODE_PU may be set to a value corresponding $(240-6*R_{TC})$.

As described above, the offset comparator 190 may detect an offset code value corresponding to the resistance $R_{TC}$ of the T-coil circuit TC, based on the first pull-up code CODE_PU1 and the second pull-up code CODE_PU2. The offset comparator 190 may generate a compensated pull-up code CODE_PUc and a compensated pull-down code CODE_PDc based on the offset code value and the target resistance of the driver DQD. The driver DQD may operate based on the compensated pull-up code CODE_PUc and the compensated pull-down code CODE_PDc. In this case, the impedance mismatching due to the resistance $R_{TC}$ of the T-coil circuit TC may be prevented.

Figure 12:
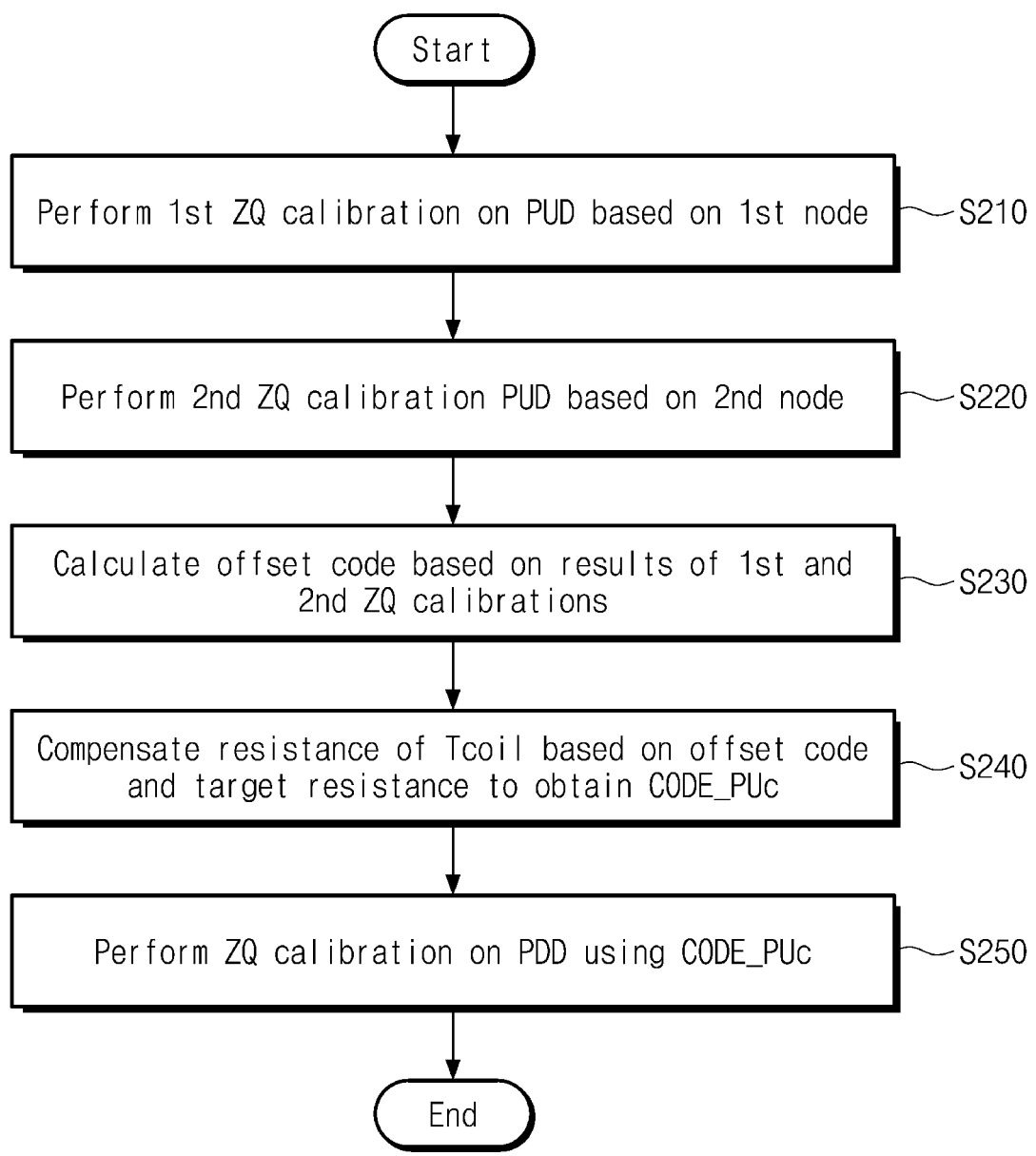
FIG. 12 is a flowchart illustrating an operation of a memory device of FIG. 11.

FIG. 12 is a flowchart illustrating an operation of a memory device of FIG. 11. Referring to FIGS. 2, 11, and 12, in operation S210, the memory device 100 may perform the first ZQ calibration operation on the pull-up driver PUD based on a first node. For example, as described with reference to FIG. 7, the ZQ controller 110 of the memory device 100 may generate the first pull-up code CODE_PU1 by performing the first ZQ calibration operation on the pull-up driver PUD based on a voltage at the first node n1. The first ZQ calibration operation based on a voltage at the first node n1 is described with reference to FIGS. 5 and 7, and thus, additional description will be omitted to avoid redundancy.

In operation S220, the memory device 100 may perform the second ZQ calibration operation on the pull-up driver PUD based on a second node. For example, as described with reference to FIG. 8, the ZQ controller 110 of the memory device 100 may generate the second pull-up code CODE_PU2 by performing the second ZQ calibration operation on the pull-up driver PUD based on a voltage at the second node n2. The second ZQ calibration operation based on a voltage at the second node n2 is described with reference to FIGS. 5 and 8, and thus, additional description will be omitted to avoid redundancy.

In operation S230, the memory device 100 may calculate an offset code corresponding to the resistance $R_{TC}$ of the T-coil circuit TC based on the results (e.g., the first pull-up code CODE_PU1 and the second pull-up code CODE_PU2) of the first and second ZQ calibration operations. For example, as described above, the first pull-up code CODE_PU1 being the result of the first ZQ calibration operation based on the voltage at the first node n1 may correspond to (240+$R_{TC}$), and the second pull-up code CODE_PU2 being the result of the second ZQ calibration operation based on the voltage at the second node n2 may correspond to (240−4*$R_{TC}$). In this case, the difference of the first and second pull-up codes CODE_PU1 and CODE_PU2 may correspond to 5*$R_{TC}$, and thus, the offset code corresponding to the resistance $R_{TC}$ of the T-coil circuit TC may be calculated.

In operation S240, the memory device 100 may generate the compensated pull-up code CODE_PUc by compensating for the resistance $R_{TC}$ of the T-coil circuit TC based on the offset code and the target resistance of the driver DQD. For example, when the target resistance of the driver DQD is set to have a resistance value of 40Ω, the compensated pull-up code CODE_PUc may be adjusted to correspond to (240−6$R_{TC}$), which is described above. Thus, additional description will be omitted to avoid redundancy.

In operation S250, the memory device 100 may perform the ZQ calibration operation on the pull-down driver PDD by using the compensated pull-up code CODE_PUc. Operation S250 is similar to that described with reference to FIG. 10 except for the pull-up code being the compensated pull-up code CODE_PUc, and thus, additional description will be omitted to avoid redundancy.

Figure 13A:
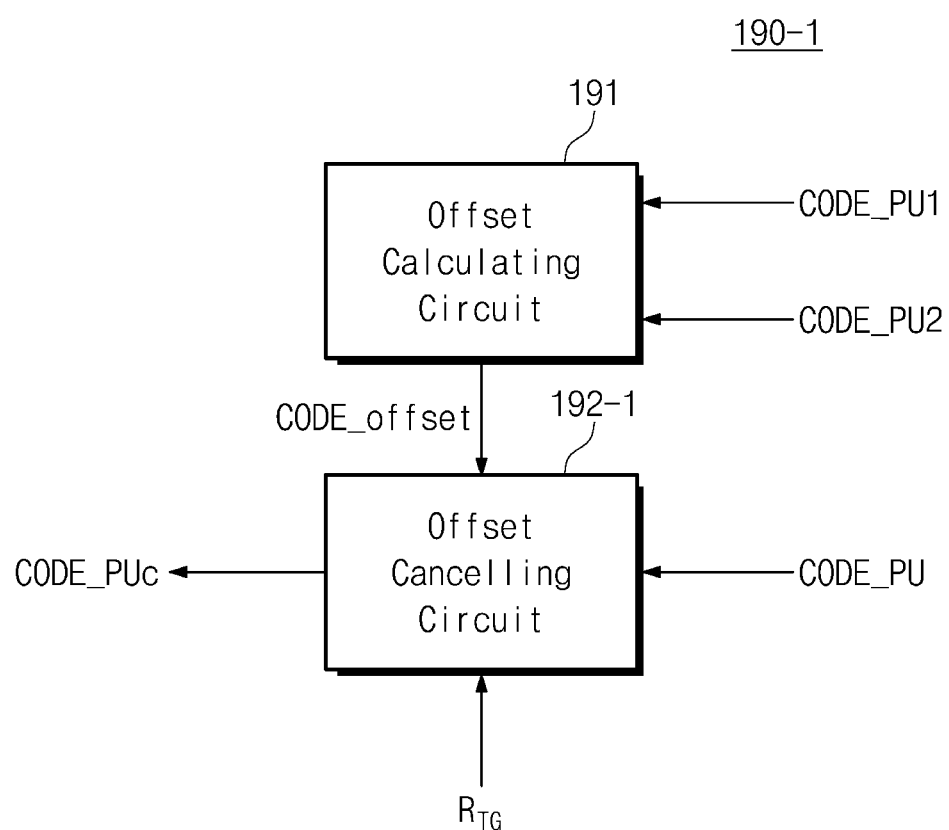
FIGS. 13A and 13B are block diagrams illustrating an offset compensator of FIG. 11.
Figure 13B:
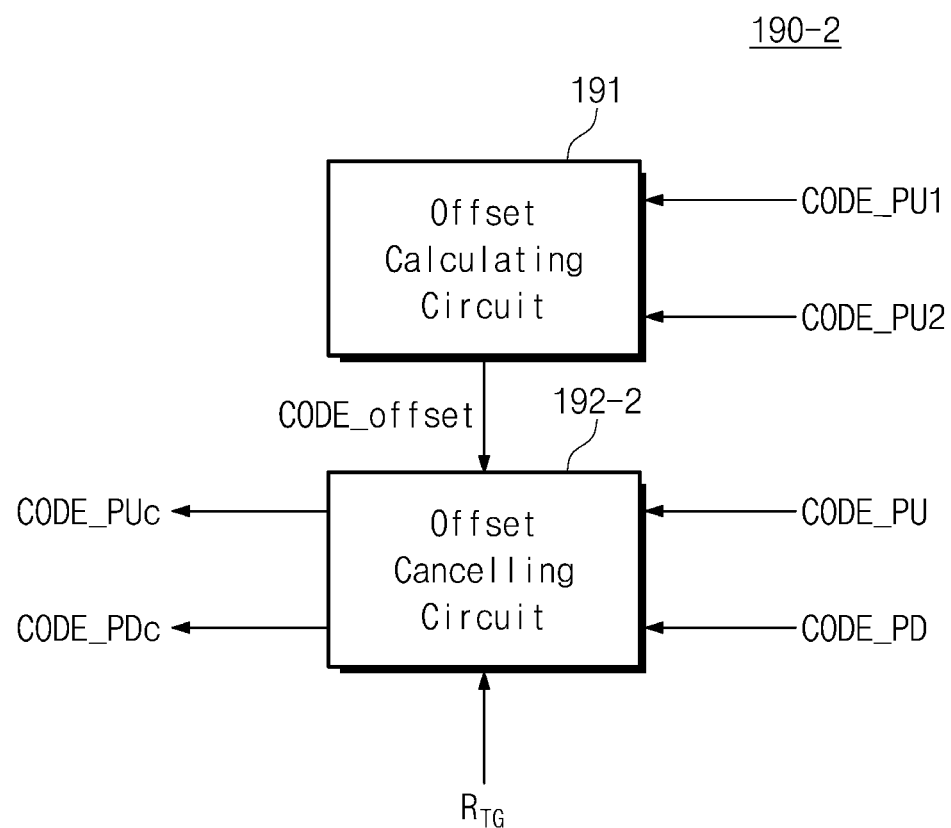

FIGS. 13A and 13B are block diagrams illustrating an offset compensator of FIG. 11. Referring to FIGS. 11 and 13A, an offset compensator 190-1 may include an offset calculating circuit 191 and an offset cancelling circuit 192-1. The offset calculating circuit 191 may be referred to as $R_{TC}$ offset calculating circuit. The offset calculating circuit 191 may receive the first pull-up code CODE_PU1 and the second pull-up code CODE_PU2 from the ZQ controller 110. The offset calculating circuit 191 may generate an offset code CODE_offset based on the first pull-up code CODE_PU1 and the second pull-up code CODE_PU2. The offset code CODE_offset may be a code value corresponding to the resistance $R_{TC}$ of the T-coil circuit TC. The offset code CODE_offset is described above, and thus, additional description will be omitted to avoid redundancy.

The offset cancelling circuit 192-1 may generate the compensated pull-up code CODE_PUc based on the offset code CODE_offset and a target resistance $R_{TG}$. For example, as described above, when target resistance $R_{TG}$ of the driver DQD is set to have a resistance value of 40Ω, the compensated pull-up code CODE_PUc may be set to correspond to (240−6*$R_{TC}$). That is, when target resistance $R_{TG}$ of the driver DQD is set to have a resistance value of 40Ω, six pull-up circuits among the plurality of pull-up circuits of the pull-up driver PUD are activated, and each of the six pull-up circuits operates in response to the compensated pull-up code CODE_PUc. In this case, the pull-up driver PUD may have a resistance value of (40−$R_{TC}$)Ω; when the resistance $R_{TC}$ of the T-coil circuit TC is applied, the resistance value of the pull-up driver PUD may be identical to a resistance value of the target resistance $R_{TG}$. That is, the resistance $R_{TC}$ of the T-coil circuit TC may be compensated for or cancelled out.

That is, the offset cancelling circuit 192-1 may generate the compensated pull-up code CODE_PUc by adjusting a compensation level of the offset code CODE_offset based on the target resistance of the pull-up driver PUD or the number of pull-up circuits PU activated.

In an embodiment, the ZQ controller 110 may generate a pull-down code by driving the pull-up driver PUD based on the compensated pull-up code CODE_PUc and performing the ZQ calibration operation on the pull-up driver PUD.

Referring to FIGS. 11 and 13B, an offset compensator 190-2 may include the offset calculating circuit 191 and an offset cancelling circuit 192-2. The offset calculating circuit 191 may generate the offset code CODE_offset based on the first pull-up code CODE_PU1 and the second pull-up code CODE_PU2. This is described above, and thus, additional description will be omitted to avoid redundancy.

The offset cancelling circuit 192-2 may generate the compensated pull-up code CODE_PUc and the compensated pull-down code CODE_PDc by performing the compensation operation on the pull-up code CODE_PU and the pull-down code CODE_PD based on the offset code CODE_offset and the target resistance $R_{TG}$. For example, the pull-up code CODE_PU and the pull-down code CODE_PD may be obtained through the first ZQ calibration operation or the second ZQ calibration operation. The offset cancelling circuit 192-2 may generate the compensated pull-up code CODE_PUc by performing the compensation operation on the pull-up code CODE_PU based on the offset code CODE_offset and the target resistance $R_{TG}$ and may generate the compensated pull-down code CODE_PDc by performing the compensation operation on the pull-down code CODE_PD based on the offset code CODE_offset and the target resistance $R_{TG}$.

In an embodiment, the ZQ calibration operation is required for each target resistance for the purpose of compensating for an offset of each target resistance. That is, it is necessary to perform the ZQ calibration operation as much as the number of target resistances. In contrast, according to the above embodiment of the disclosure, the offset code CODE_offset corresponding to the resistance $R_{TC}$ of the T-coil circuit TC may be generated through the ZQ calibration operation for each of the first and second nodes n1 and n2, and the offset compensation may be performed for each of various target resistances, based on the offset code CODE_offset. That is, the offset code CODE_offset corresponding to the resistance $R_{TC}$ of the T-coil circuit TC may be accurately detected through the ZQ calibration operations, the number of which is reduced.

Figure 14:
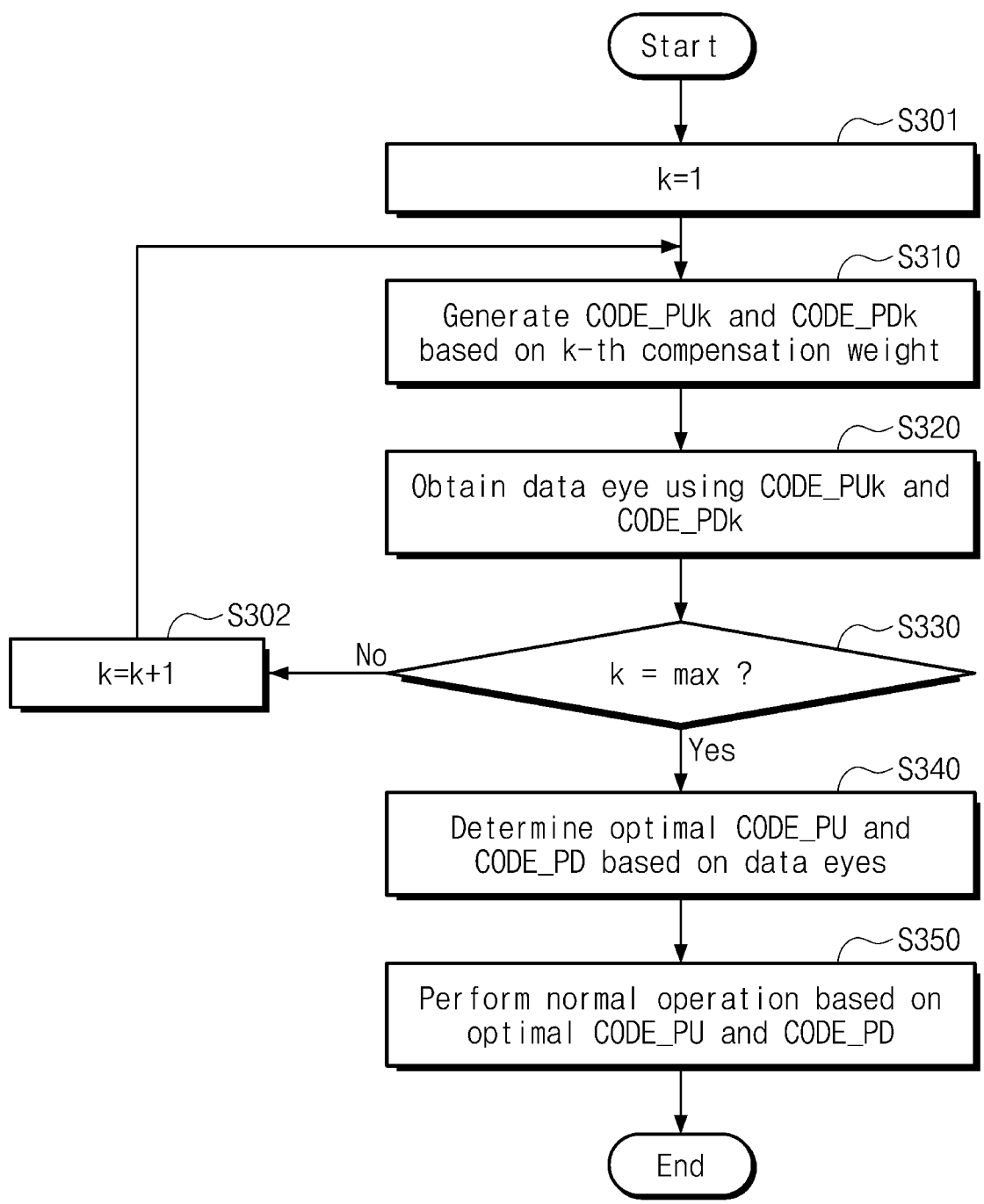
FIG. 14 is a flowchart illustrating an operation of a memory device of FIG. 11.

FIG. 14 is a flowchart illustrating an operation of a memory device of FIG. 11. Referring to FIGS. 11 and 14, in operation S301, a variable "k" is set to "1". In an embodiment, the variable "k" is for describing an iterative operation of the memory device 100 and is not interpreted to have any other technical meaning.

In operation S310, the memory device 100 may generate a k-th compensated pull-up code CODE_PUk and a k-th compensated pull-down code CODE_PDk based on a k-th compensation weight. For example, as described with reference to FIGS. 11 to 13B, the offset compensation for the pull-up code CODE_PU and the pull-down code CODE_PD may be performed based on the offset code CODE_offset and the target resistance $R_{TG}$. However, the impedance mismatching may still exist due to various parasitic resistances and various parasitic capacitances actually occurring in the driver DQD. As such, the memory device 100 may generate the k-th compensated pull-up code CODE_PUk and the k-th compensated pull-down code CODE_PDk by applying the k-th compensation weight to the offset code CODE_offset. In an embodiment, the k-th compensated pull-up code CODE_PUk may be included in a range of the pull-up code CODE_PU before compensation and the compensated pull-up code CODE_PUc to which a weight is not applied, and the k-th compensated pull-down code CODE_PDk may be included in a range of the pull-down code CODE_PD before compensation and the compensated pull-down code CODE_PDc to which a weight is not applied.

In operation S320, the memory device 100 may obtain a data eye by using the k-th compensated pull-up code CODE_PUK and the k-th compensated pull-down code CODE_PDk. For example, the memory device 100 may drive the driver DQD by using the k-th compensated pull-up code CODE_PUk and the k-th compensated pull-down code CODE_PDk. The memory device 100 may obtain the data eye of the data signal DQ driven by the driver DQD. In an embodiment, the operation of obtaining the data eye (i.e., operation S320) may be performed by the memory controller 11.

In operation S330, whether the variable "k" is a maximum value may be determined. When the variable "k" is not the maximum value (i.e., when the iterative operation exists), in operation S302, the variable "k" may increase as much as "1", and the memory device 100 may again perform operation S310.

When the variable "k" is the maximum value (i.e., when the iterative operation is completed), in operation S340, the memory device 100 may determine an optimal pull-up code among a plurality of compensated pull-up codes and an optimal pull-down code among a plurality of compensated pull-down codes, based on the obtained data eye. For example, the size of the data eye may change depending on an offset compensation amount of the pull-up code CODE_PU and the pull-down code CODE_PD. The memory device 100 may determine an optimal pull-up code and an optimal pull-down code such that the size of the data eye is maximized.

In an embodiment, the operation of comparing sizes of data eyes (i.e., operation S340) may be performed by the memory controller 11.

In operation S350, the memory device 100 may perform a normal operation (i.e., may drive a plurality of drivers) based on the optimal pull-up code CODE_PU and the optimal pull-down code CODE_PD determined in operation S340.

Figure 15:
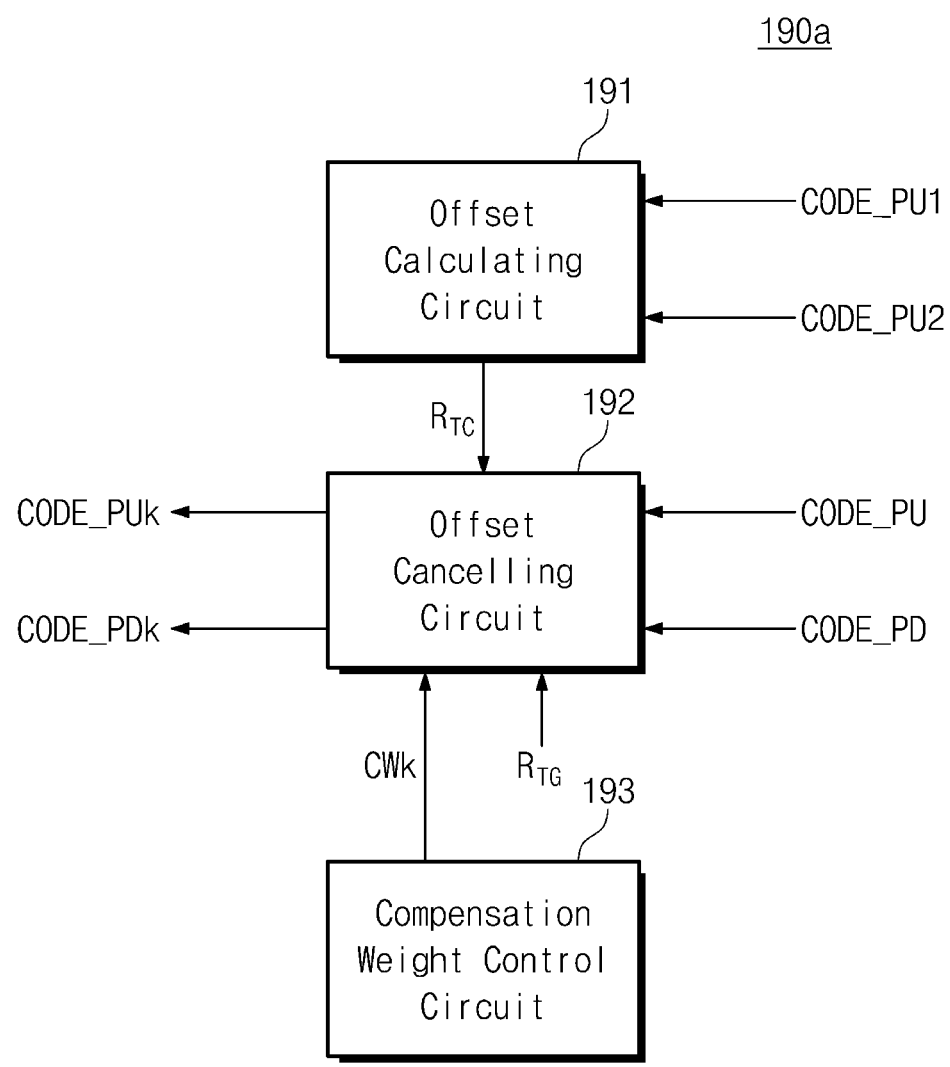
FIG. 15 is a block diagram illustrating an offset compensator configured to perform an operation according to the flowchart of FIG. 14.
Figure 16:
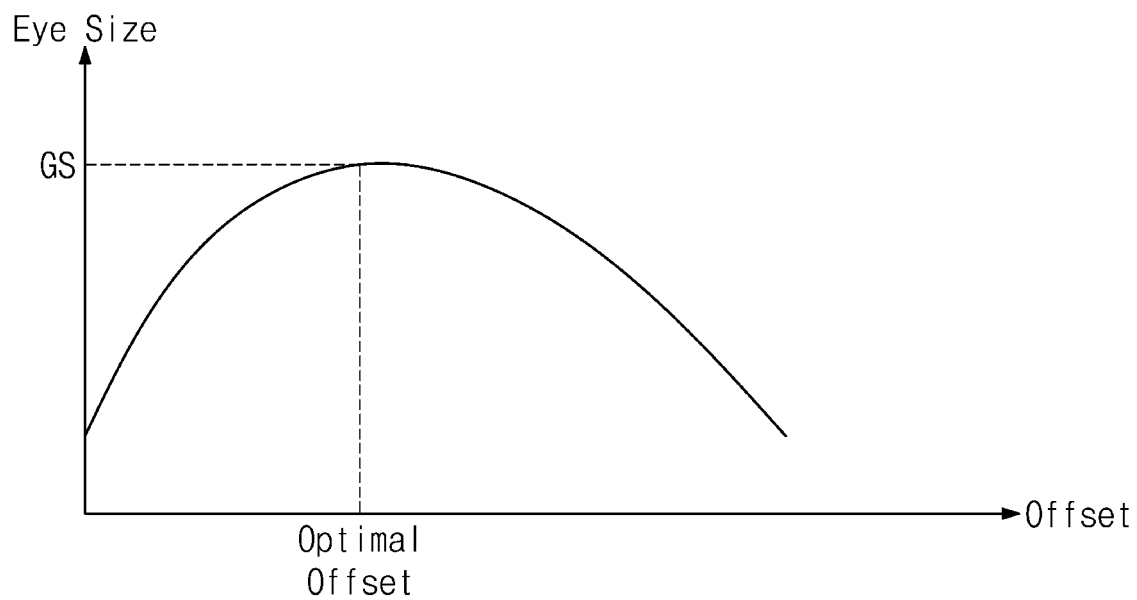
FIG. 16 is a graph for describing an operation of an offset compensator of FIG. 15.

FIG. 15 is a block diagram illustrating an offset compensator configured to perform an operation according to the flowchart of FIG. 14. FIG. 16 is a graph for describing an operation of an offset compensator of FIG. 15. In the graph of FIG. 16, a horizontal axis represents an offset compensation amount of a pull-up code and a pull-down code, and a vertical axis represents a size of a data eye of a data signal.

Referring to FIGS. 11, 14, and 15, an offset comparator 190a may include the offset calculating circuit 191, an offset cancelling circuit 192a, and a compensation weight control circuit 193. The offset calculating circuit 191 is similar to that described above, and thus, additional description will be omitted to avoid redundancy.

The offset cancelling circuit 192a may perform offset compensation on the pull-up code CODE_PU and the pull-down code CODE_PD based on the target resistance $R_{TG}$ and the offset code CODE_offset. In this case, the offset cancelling circuit 192a may adjust an offset compensation amount of the pull-up code CODE_PU and the pull-down code CODE_PD based on a k-th compensation weight CWk. For example, the offset cancelling circuit 192a may determine an offset compensation amount to be applied to the pull-up code CODE_PU and the pull-down code CODE_PD based on the target resistance $R_{TG}$ and the offset code CODE_offset. The offset cancelling circuit 192a may calculate an k-th offset compensation amount by applying the k-th compensation weight CWk to the determined offset compensation amount and may generate the k-th compensated pull-up code CODE_PUk and the k-th compensated pull-down code CODE_PDk by applying the k-th offset compensation amount thus calculated to the pull-up code CODE_PU and the pull-down code CODE_PD.

The k-th compensation weight CWk may be managed by the compensation weight control circuit 193.

In an embodiment, the size of the data eye may change depending on the offset compensation amount. For example, as illustrated in FIG. 16, the size of the data eye may increase or decrease depending on the offset compensation amount. In this case, the memory device 100 (or the memory controller 11) may determine an optimal offset value (or a compensation weight) such that the data eye is maximized. The offset comparator 190a may generate the optimal pull-up code CODE_PU and the optimal pull-down code CODE_PD based on the optimal offset value (or compensation weight).

Figure 17:
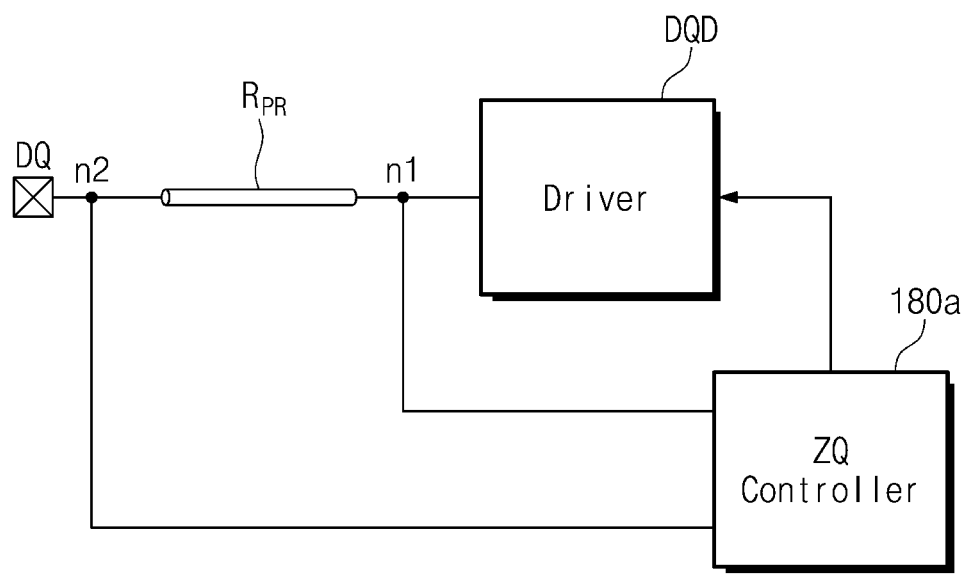
FIG. 17 is a diagram for describing an operation of a ZQ controller of FIG. 2.

FIG. 17 is a diagram for describing an operation of a ZQ controller of FIG. 2. Referring to FIGS. 2 and 17, a ZQ controller 180a may perform the ZQ calibration operation on the driver DQD. In this case, as described with reference to FIGS. 1 to 16, the ZQ controller 180a may perform the first ZQ calibration operation based on a voltage at the first node n1 or may perform the second ZQ calibration operation based on a voltage at the second node n2. Alternatively, the ZQ controller 180a may be configured to compensate for an offset according to a parasitic resistance $R_{PR}$ through the first ZQ calibration operation based on a voltage at the first node n1 and the second ZQ calibration operation based on a voltage at the second node n2.

In an embodiment, the driver DQD described with reference to FIGS. 1 to 16 includes the T-coil circuit TC for a high-speed operation, and the ZQ controller 180a and the offset comparator 190 are configured to compensate for the resistance $R_{TC}$ of the T-coil circuit TC. In contrast, the driver DQD of FIG. 17 may not include the T-coil circuit TC. In this case, the ZQ controller 180*a* (or an offset compensator) may be configured to compensate for the parasitic resistance $R_{PR}$ or a parasitic capacitance capable of occurring between the driver DQD and the Driver DQD, based on the method described with reference to FIGS. 1 to 16.

To describe embodiment of the disclosure easily, the above embodiments are described based on one driver. However, the disclosure is not limited thereto. For example, the memory device 100 may further include a plurality of other drivers (i.e., a plurality of other pull-up drivers and a plurality of other pull-down drivers), and each of the plurality of other drivers may operate based on the pull-up code CODE_PU and the pull-down code CODE_PD generated in the above embodiments.

Figure 18:
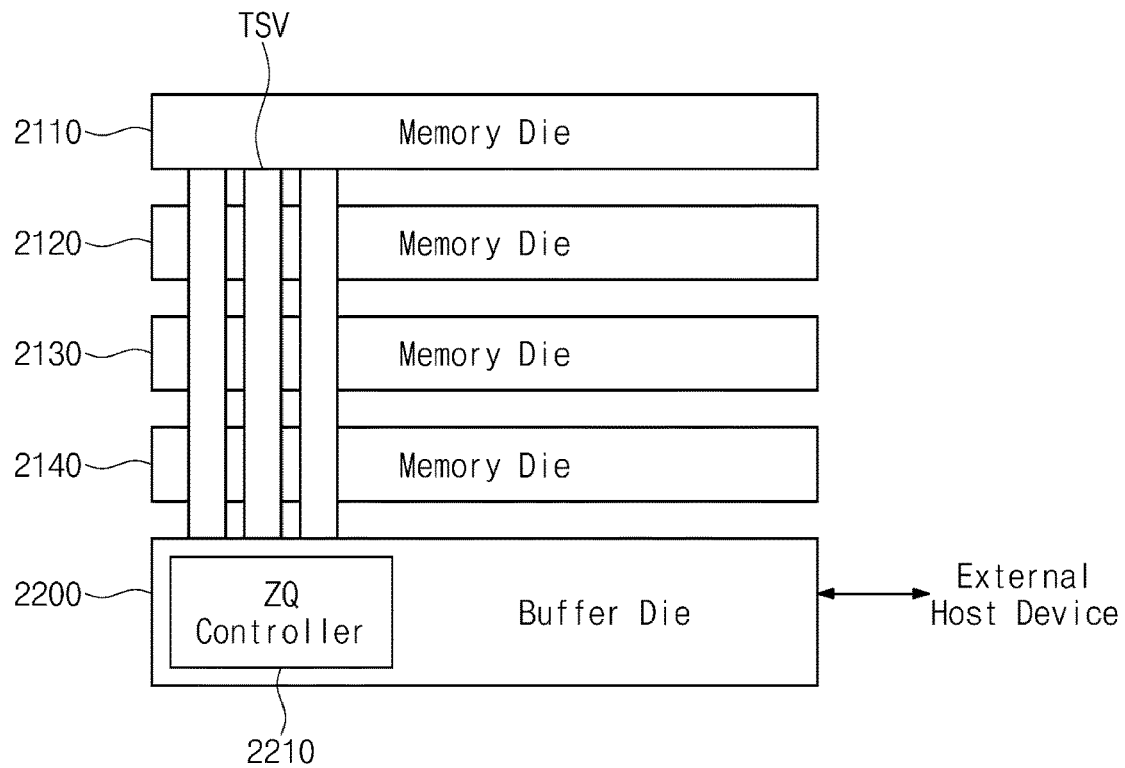
FIG. 18 is a diagram illustrating an example of a memory package according to an embodiment of the disclosure.

FIG. 18 is a diagram illustrating an example of a memory package according to an embodiment of the disclosure. Referring to FIG. 18, a memory package 2000 may include a plurality of memory dies 2110, 2120, 2130 and 2140 and a buffer die 2200. Each of the plurality of memory dies 2110 to 2140 may be a DRAM device. The plurality of memory dies 2110 to 2140 and the buffer die 2200 may be implemented in a stacked structure, may be electrically connected to each other through the TSV (through silicon via), and may communicate with each other.

In an embodiment, the memory package 2000 may be provided as one semiconductor package through packaging by the following: package on package (POP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), or wafer-level processed stack package (WSP).

The buffer die 2200 may communicate with an external host device (or a memory controller). The buffer die 2200 may be configured to temporarily store data to be written in the plurality of memory dies 2110 to 2140 or temporarily store data read from the plurality of memory dies 2110 to 2140.

In an embodiment, the buffer die 2200 may include a ZQ controller 2210. The ZQ controller 2210 may operate based on the operation method described with reference to FIGS. 1 to 17. For example, the buffer die 2200 may include a plurality of drivers configured to drive data lines electrically connected to the external host device. Each of the plurality of drivers may include a T-coil circuit for a high-speed operation. The ZQ controller 2210 may perform the ZQ calibration operation for impedance mismatching on the plurality of drivers, based on the operation method described with reference to FIGS. 1 to 19 and may be configured to compensate for a resistance or any other parasitic resistance of the T-coil circuit.

Figure 19:
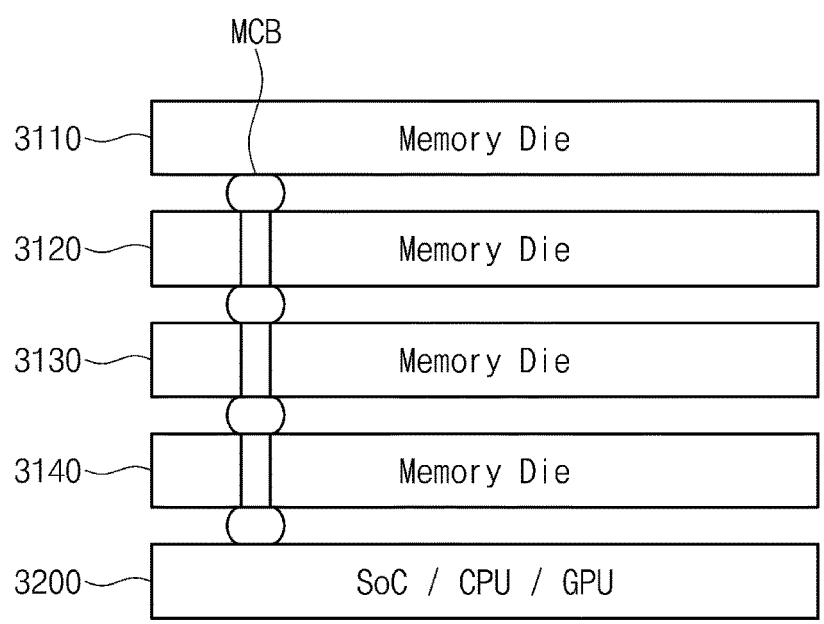
FIG. 19 is a diagram illustrating an example of a memory package according to an embodiment of the disclosure.

FIG. 19 is a diagram illustrating an example of a memory package according to an embodiment of the disclosure. Referring to FIG. 19, a memory package 3000 may include a plurality of memory dies 3110, 3120, 3130 and 3140 and a host die 3200. The plurality of memory dies 3110 to 3140 may be electrically connected to each other through micro bumps MCB, may have a stacked structure, and may be directly stacked on the host die 3200. The host die 3200 may be a SoC, a CPU, or a GPU. In an embodiment, each of the plurality of memory dies 3110 to 3140 or the host die 3200 may include the ZQ controller described with reference to FIGS. 1 to 17 and may operate based on the operation method described with reference to FIGS. 1 to 17.

In an embodiment, it may be understood that the memory packages described with reference to FIGS. 18 and 19 are only examples, the scope of the invention is not limited thereto, and a memory device or a memory package according to the disclosure is implemented in various forms.

Figure 20:
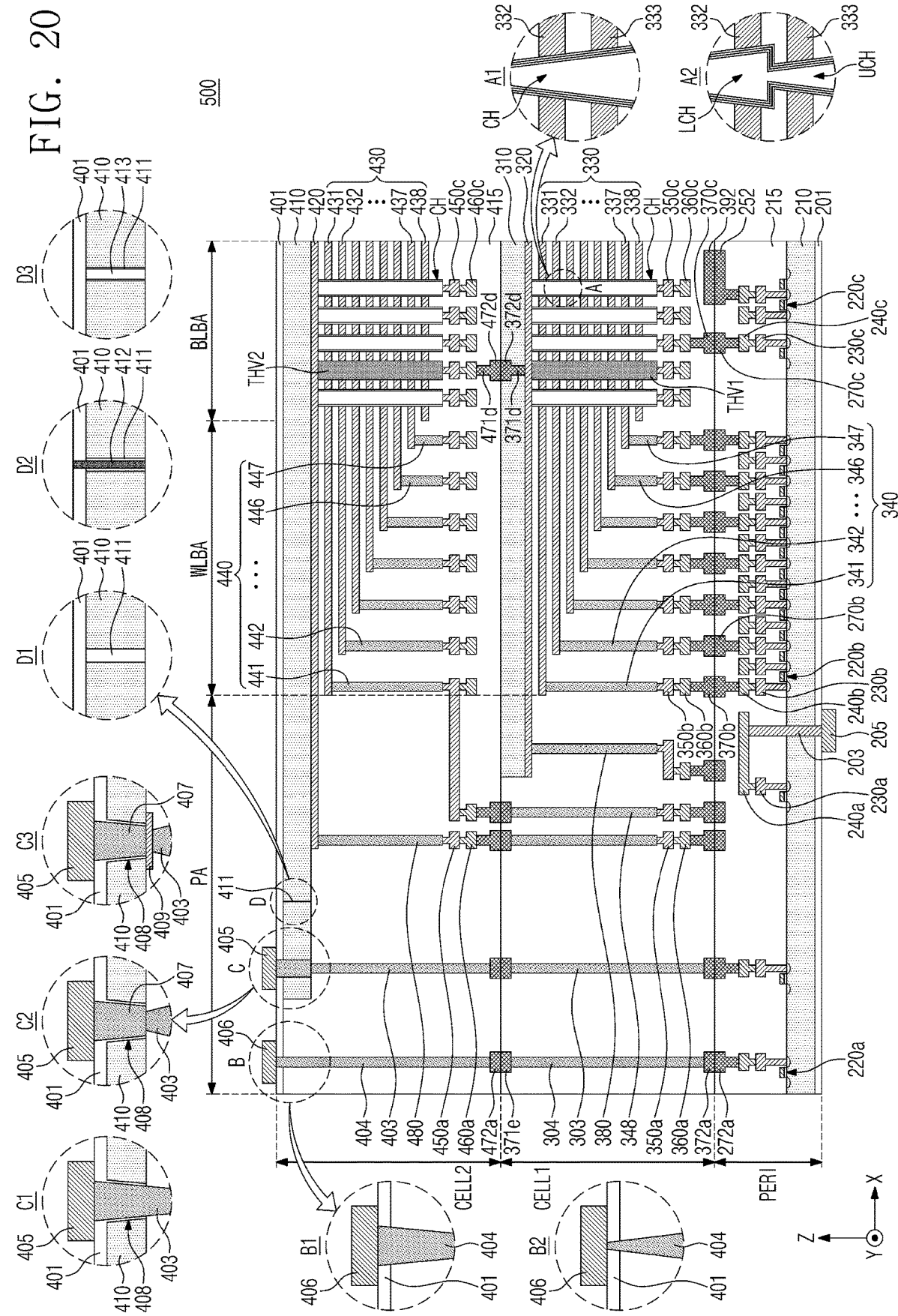
FIG. 20 is a view for describing a memory device according to an embodiment of the disclosure.

FIG. 20 is a view illustrating a memory device 500 according to some embodiments of the inventive concepts.

Referring to FIG. 20, the memory device 500 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 500 may include the at least one upper chip including the cell region. For example, as illustrated in FIG. 20, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 20. However, embodiments of the inventive concepts are not limited thereto. In certain embodiments, one of the first upper chip and the second upper chip may be turned over and then may be connected to a corresponding chip by the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 210 and a plurality of circuit elements 220*a*, 220*b* and 220*c* formed on the first substrate 210. An interlayer insulating layer 215 including one or more insulating layers may be provided on the plurality of circuit elements 220*a*, 220*b* and 220*c*, and a plurality of metal lines electrically connected to the plurality of circuit elements 220*a*, 220*b* and 220*c* may be provided in the interlayer insulating layer 215. For example, the plurality of metal lines may include first metal lines 230a, 230b and 230c connected to the plurality of circuit elements 220a, 220b and 220c, and second metal lines 240a, 240b and 240c formed on the first metal lines 230a, 230b and 230c. The plurality of metal lines may be formed of at least one of various conductive materials. For example, the first metal lines 230a, 230b and 230c may be formed of tungsten having a relatively high electrical resistivity, and the second metal lines 240a, 240b and 240c may be formed of copper having a relatively low electrical resistivity.

The first metal lines 230a, 230b and 230c and the second metal lines 240a, 240b and 240c are illustrated and described in the present embodiments. However, embodiments of the inventive concepts are not limited thereto. In certain embodiments, at least one or more additional metal lines may further be formed on the second metal lines 240a, 240b and 240c. In this case, the second metal lines 240a, 240b and 240c may be formed of aluminum, and at least some of the additional metal lines formed on the second metal lines 240a, 240b and 240c may be formed of copper having an electrical resistivity lower than that of aluminum of the second metal lines 240a, 240b and 240c.

The interlayer insulating layer 215 may be disposed on the first substrate 210 and may include an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 to 338) may be stacked on the second substrate 310 in a direction (i.e., the Z-axis direction) perpendicular to a top surface of the second substrate 310. String selection lines and a ground selection line may be disposed on and under the word lines 330, and the plurality of word lines 330 may be disposed between the string selection lines and the ground selection line. Likewise, the second cell region CELL2 may include a third substrate 410 and a common source line 420, and a plurality of word lines 430 (431 to 438) may be stacked on the third substrate 410 in a direction (i.e., the Z-axis direction) perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in a region 'A1', the channel structure CH may be provided in the bit line bonding region BLBA and may extend in the direction perpendicular to the top surface of the second substrate 310 to penetrate the word lines 330, the string selection lines, and the ground selection line. The channel structure CH may include a data storage layer, a channel layer, and a filling insulation layer. The channel layer may be electrically connected to a first metal line 350c and a second metal line 360c in the bit line bonding region BLBA. For example, the second metal line 360c may be a bit line and may be connected to the channel structure CH through the first metal line 350c. The bit line 360c may extend in a first direction (e.g., a Y-axis direction) parallel to the top surface of the second substrate 310.

In some embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 310 to penetrate the common source line 320 and lower word lines 331 and 332. The lower channel LCH may include a data storage layer, a channel layer, and a filling insulation layer and may be connected to the upper channel UCH. The upper channel UCH may penetrate upper word lines 333 to 338. The upper channel UCH may include a data storage layer, a channel layer, and a filling insulation layer, and the channel layer of the upper channel UCH may be electrically connected to the first metal line 350c and the second metal line 360c. As a length of a channel increases, due to characteristics of manufacturing processes, it may be difficult to form a channel having a substantially uniform width. The memory device 500 according to the present embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 332 and 333 adjacent to the boundary between the lower channel LCH and the upper channel UCH may be the dummy word lines. In this case, data may not be stored in memory cells connected to the dummy word line. Alternatively, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 331 and 332 penetrated by the lower channel LCH is less than the number of the upper word lines 333 to 338 penetrated by the upper channel UCH in the region 'A2'. However, embodiments of the inventive concepts are not limited thereto. In certain embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 20, the first through-electrode THV1 may penetrate the common source line 320 and the plurality of word lines 330. In certain embodiments, the first through-electrode THV1 may further penetrate the second substrate 310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 372d and a second through-metal pattern 472d. The first through-metal pattern 372d may be formed at a bottom end of the first upper chip including the first cell region CELL1, and the second through-metal pattern 472d may be formed at a top end of the second upper chip including the second cell region CELL2. The first through-electrode THV1 may be electrically connected to the first metal line 350c and the second metal line 360c. A lower via 371d may be formed between the first through-electrode THV1 and the first through-metal pattern 372d, and an upper via 471d may be formed between the second through-electrode THV2 and the second through-metal pattern 472d. The first through-metal pattern 372d and the second through-metal pattern 472d may be connected to each other by the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit line bonding region BLBA, the bit line 360c may be electrically connected to a page buffer included in the peripheral circuit region PERI. For example, some of the circuit elements 220c of the peripheral circuit region PERI may constitute the page buffer, and the bit line 360c may be electrically connected to the circuit elements 220c constituting the page buffer through an upper bonding metal pattern 370c of the first cell region CELL1 and an upper bonding metal pattern 270c of the peripheral circuit region PERI.

Referring continuously to FIG. 20, in the word line bonding region WLBA, the word lines 330 of the first cell region CELL1 may extend in a second direction (e.g., an X-axis direction) parallel to the top surface of the second substrate 310 and may be connected to a plurality of cell contact plugs 340 (341 to 347). First metal lines 350b and second metal lines 360b may be sequentially connected onto the cell contact plugs 340 connected to the word lines 330. In the word line bonding region WLBA, the cell contact plugs 340 may be connected to the peripheral circuit region PERI through upper bonding metal patterns 370b of the first cell region CELL1 and upper bonding metal patterns 270b of the peripheral circuit region PERI.

The cell contact plugs 340 may be electrically connected to a row decoder included in the peripheral circuit region PERI. For example, some of the circuit elements 220b of the peripheral circuit region PERI may constitute the row decoder, and the cell contact plugs 340 may be electrically connected to the circuit elements 220b constituting the row decoder through the upper bonding metal patterns 370b of the first cell region CELL1 and the upper bonding metal patterns 270b of the peripheral circuit region PERI. In some embodiments, an operating voltage of the circuit elements 220b constituting the row decoder may be different from an operating voltage of the circuit elements 220c constituting the page buffer. For example, the operating voltage of the circuit elements 220c constituting the page buffer may be greater than the operating voltage of the circuit elements 220b constituting the row decoder.

Likewise, in the word line bonding region WLBA, the word lines 430 of the second cell region CELL2 may extend in the second direction (e.g., the X-axis direction) parallel to the top surface of the third substrate 410 and may be connected to a plurality of cell contact plugs 440 (441 to 447). The cell contact plugs 440 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 370b may be formed in the first cell region CELL1, and the upper bonding metal patterns 270b may be formed in the peripheral circuit region PERI. The upper bonding metal patterns 370b of the first cell region CELL1 and the upper bonding metal patterns 270b of the peripheral circuit region PERI may be electrically connected to each other by the bonding method. The upper bonding metal patterns 370b and the upper bonding metal patterns 270b may be formed of aluminum, copper, or tungsten.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected to each other by the bonding method in the external pad bonding region PA. Likewise, an upper metal pattern 372a may be formed in an upper portion of the first cell region CELL1, and an upper metal pattern 272a may be formed in an upper portion of the peripheral circuit region PERI. The upper metal pattern 372a of the first cell region CELL1 and the upper metal pattern 272a of the peripheral circuit region PERI may be connected to each other by the bonding method.

Common source line contact plugs 380 and 480 may be disposed in the external pad bonding region PA. The common source line contact plugs 380 and 480 may be formed of a conductive material such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405 and 406 may be disposed in the external pad bonding region PA. Referring to FIG. 20, a lower insulating layer 201 may cover a bottom surface of the first substrate 210, and a first input/output pad 205 may be formed on the lower insulating layer 201. The first input/output pad 205 may be connected to at least one of a plurality of the circuit elements 220a disposed in the peripheral circuit region PERI through a first input/output contact plug 203 and may be separated from the first substrate 210 by the lower insulating layer 201. In addition, a side insulating layer may be disposed between the first input/output contact plug 203 and the first substrate 210 to electrically isolate the first input/output contact plug 203 from the first substrate 210.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220a disposed in the peripheral circuit region PERI through second input/output contact plugs 403 and 303, and the third input/output pad 406 may be connected to at least one of the plurality of circuit elements 220a disposed in the peripheral circuit region PERI through third input/output contact plugs 404 and 304.

In some embodiments, the third substrate 410 may not be disposed in a region in which the input/output contact plug is disposed. For example, as illustrated in a region "B", the third input/output contact plug 404 may be separated from the third substrate 410 in a direction parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In some embodiments, as illustrated in a region 'B1', the third input/output contact plug 404 may extend in a third direction (e.g., the Z-axis direction), and a diameter of the third input/output contact plug 404 may become progressively greater toward the upper insulating layer 401. In other words, a diameter of the channel structure CH described in the region 'A1' may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In certain embodiments, as illustrated in a region 'B2', the third input/output contact plug 404 may extend in the third direction (e.g., the Z-axis direction), and a diameter of the third input/output contact plug 404 may become progressively less toward the upper insulating layer 401. In other words, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In certain embodiments, the input/output contact plug may overlap with the third substrate 410. For example, as illustrated in a region 'C', the second input/output contact plug 403 may penetrate the interlayer insulating layer 415 of the second cell region CELL2 in the third direction (e.g., the Z-axis direction) and may be electrically connected to the second input/output pad 405 through the third substrate 410. In this case, a connection structure of the second input/output contact plug 403 and the second input/output pad 405 may be realized by various methods.

In some embodiments, as illustrated in a region 'C1', an opening 408 may be formed to penetrate the third substrate 410, and the second input/output contact plug 403 may be connected directly to the second input/output pad 405 through the opening 408 formed in the third substrate 410. In this case, as illustrated in the region 'C1', a diameter of the second input/output contact plug 403 may become progressively greater toward the second input/output pad 405. However, embodiments of the inventive concepts are not limited thereto, and in certain embodiments, the diameter of the second input/output contact plug 403 may become progressively less toward the second input/output pad 405.

In certain embodiments, as illustrated in a region 'C2', the opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Thus, the second input/output contact plug 403 may be electrically connected to the second input/output pad 405 through the contact 407 in the opening 408. In this case, as illustrated in the region 'C2', a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In certain embodiments illustrated in a region 'C3', a stopper 409 may further be formed on a bottom end of the opening 408 of the third substrate 410, as compared with the embodiments of the region 'C2'. The stopper 409 may be a metal line formed in the same layer as the common source line 420. Alternatively, the stopper 409 may be a metal line formed in the same layer as at least one of the word lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371e or may become progressively greater toward the lower metal pattern 371e.

Meanwhile, in some embodiments, a slit 411 may be formed in the third substrate 410. For example, the slit 411 may be formed at a certain position of the external pad bonding region PA. For example, as illustrated in a region 'D', the slit 411 may be located between the second input/output pad 405 and the cell contact plugs 440 when viewed in a plan view. Alternatively, the second input/output pad 405 may be located between the slit 411 and the cell contact plugs 440 when viewed in a plan view.

In some embodiments, as illustrated in a region 'D1', the slit 411 may be formed to penetrate the third substrate 410. For example, the slit 411 may be used to prevent the third substrate 410 from being finely cracked when the opening 408 is formed. However, embodiments of the inventive concepts are not limited thereto, and in certain embodiments, the slit 411 may be formed to have a depth ranging from about 60% to about 70% of a thickness of the third substrate 410.

In certain embodiments, as illustrated in a region 'D2', a conductive material 412 may be formed in the slit 411. For example, the conductive material 412 may be used to discharge a leakage current occurring in driving of the circuit elements in the external pad bonding region PA to the outside. In this case, the conductive material 412 may be connected to an external ground line.

In certain embodiments, as illustrated in a region 'D3', an insulating material 413 may be formed in the slit 411. For example, the insulating material 413 may be used to electrically isolate the second input/output pad 405 and the second input/output contact plug 403 disposed in the external pad bonding region PA from the word line bonding region WLBA. Since the insulating material 413 is formed in the slit 411, it is possible to prevent a voltage provided through the second input/output pad 405 from affecting a metal layer disposed on the third substrate 410 in the word line bonding region WLBA.

Meanwhile, in certain embodiments, the first to third input/output pads 205, 405 and 406 may be selectively formed. For example, the memory device 500 may be realized to include only the first input/output pad 205 disposed on the first substrate 210, to include only the second input/output pad 405 disposed on the third substrate 410, or to include only the third input/output pad 406 disposed on the upper insulating layer 401.

In some embodiments, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering a top surface of the common source line 320 or a conductive layer for connection may be formed. Likewise, the third substrate 410 of the second cell region CELL2 may be removed before or after the bonding process of the first cell region CELL1 and the second cell region CELL2, and then, the upper insulating layer 401 covering a top surface of the common source line 420 or a conductive layer for connection may be formed.

In an embodiment, the memory device described with reference to FIGS. 1 to 19 may be a DRAM device. However, the disclosure is not limited thereto. For example, the memory device according to the disclosure may be a flash memory device as illustrated in FIG. 20. For example, the memory device of FIG. 20 may include a plurality of drivers configured to drive data lines electrically connected to the external device. Each of the plurality of drivers may include a T-coil circuit for a high-speed operation. The memory device 500 may include the ZQ controller described with reference to FIGS. 1 to 17 and may be configured to compensate for an offset for a resistance of a T-coil circuit through the ZQ calibration operation and the offset compensation operation described with reference to FIGS. 1 to 17.

According to embodiments of the disclosure, a memory device with improved reliability and improved performance, an electronic device including the memory device, and an operation method of the memory device are provided.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A memory device comprising:
a pull-up driver connected between a power supply voltage and a first node;
a T-coil circuit connected between the first node and a second node;
an external resistor; and
a ZQ controller configured to perform a ZQ calibration operation on the pull-up driver,
wherein the ZQ controller comprises:
a path selecting circuit configured to select one node among the first node and the second node;
a comparing circuit configured to:
compare a voltage of the one node selected by the path selecting circuit with a pull-up reference voltage, and
output a comparison result based the comparison between the voltage of the one node selected by the path selecting circuit and the pull-up reference voltage; and
a code generating circuit configured to generate a pull-up code for driving the pull-up driver, based on the comparison result, and
wherein, while the pull-up code is generated, the external resistor is connected between the second node and a ground voltage.

2. The memory device of claim 1, wherein the path selecting circuit configured to select the one node among the first and second nodes based on designation of a ZQ calibration mode.

3. The memory device of claim 2, wherein the ZQ calibration mode is designated, by an external memory controller, based on a reference resistance set to the pull-up driver corresponding to when the pull-up code is generated and a target resistance set to the pull-up driver corresponding to when the pull-up driver is driven.

4. The memory device of claim 1, wherein, when the first node is selected by the path selecting circuit, the code generating circuit is configured to generate a first pull-up code, and
wherein, when the second node is selected by the path selecting circuit, the code generating circuit is configured to generate a second pull-up code.

5. The memory device of claim 4, wherein the ZQ controller further comprises:
a ZQ register configured to store the first pull-up code and the second pull-up code.

6. The memory device of claim 5, wherein the ZQ controller is configured to select one code among the first pull-up code and the second pull-up code, based on a target resistance of the pull-up driver, and
wherein the pull-up driver is configured to operate based on the selected one code among the first pull-up code and the second pull-up code.

7. The memory device of claim 4, further comprising:
an offset compensator configured to:
generate an offset code corresponding to a resistance of the T-coil circuit, based on the first pull-up code and the second pull-up code; and
generate a compensated pull-up code based on the offset code.

8. The memory device of claim 7, wherein the offset compensator is further configured to generate the compensated pull-up code by adjusting a compensation amount of the offset code based on a target resistance of the pull-up driver.

9. The memory device of claim 7, wherein the pull-up driver comprises a plurality of pull-up circuits, and
wherein the offset compensator is further configured to generate the compensated pull-up code by adjusting a compensation amount of the offset code, based on the number of pull-up circuits activated during driving the pull-up driver from among the plurality of pull-up circuits.

10. The memory device of claim 7, wherein the ZQ controller is further configured to:
provide the compensated pull-up code to the pull-up driver; and generate a pull-down code for a pull-down driver connected between the pull-up driver and the ground voltage.

11. The memory device of claim 10, wherein, in a data transmission operation of the memory device, the pull-up driver and the pull-down driver are connected in series between the power supply voltage and the ground voltage,
wherein the T-coil circuit is provided between the first node between the pull-up driver and the pull-down driver and an input/output pad, and
wherein, as the pull-up driver operates based on the compensated pull-up code and the pull-down driver operates based on the pull-down code, a data signal is output through the input/output pad.

12. The memory device of claim 10, further comprising:
a plurality of second pull-up drivers; and
a plurality of second pull-down drivers,
wherein each of the plurality of second pull-up drivers operates based on the compensated pull-up code, and
wherein each of the plurality of second pull-down drivers operates based on the pull-up code.

13. The memory device of claim 1, wherein the ZQ controller is configured to:
generate the pull-up reference voltage based on a reference resistance set to the pull-up driver corresponding to when the pull-up code is generated.

14. The memory device of claim 1, further comprising:
a receiver configured to receive a data signal from an external memory controller through the T-coil circuit.

15. The memory device of claim 1, further comprising:
a memory cell array comprising a plurality of dynamic random access memory (DRAM) cells;
a command and address buffer configured to receive and buffer command/address signals (CA) from an external memory controller;
an address decoder configured to receive an address signal from the command and address buffer and to decode the address signal;
a command decoder configured to receive a command signal from the command and address buffer and to decode the command signal;
a row decoder configured to control a plurality of word lines connected to the memory cell array depending on the address decoding result of the address decoder;
a columns decoder configured to control a plurality of bit lines connected to the memory cell array depending on the address decoding result of the address decoder;
an input/output circuit including the pull-up driver and the T-coil circuit, and configured to exchange data with the external memory controller; and
a control logic circuit configured to control the input/output circuit and the ZQ controller, based on the decoding result of the command decoder.

16. An operation method of a memory device, the method comprising:
generating a first pull-up code by comparing a first voltage at a first node between a pull-up driver and a T-coil circuit with a pull-up reference voltage;
generating a second pull-up code by comparing a second voltage at a second node between the T-coil circuit and an external resistor with the pull-up reference voltage;
generating an offset code corresponding to a resistance of the T-coil circuit, based on the first pull-up code and the second pull-up code; and
generating a compensated pull-up code, based on the offset code and a target resistance of the pull-up driver,
wherein the pull-up driver, the T-coil circuit, and the external resistor are connected in series between a power supply voltage and a ground voltage.

17. The method of claim 16, further comprising:
driving the pull-up driver based on the compensated pull-up code; and
generating a pull-down code by comparing a third voltage of a third node between the pull-up driver and a pull-down driver and a pull-down reference voltage,
wherein the pull-up driver and the pull-down driver are connected in series between the power supply voltage and the ground voltage.

18. The method of claim 17, further comprising:
outputting a data signal through the T-coil circuit by driving the pull-up driver based on the compensated pull-up code and driving the pull-down driver based on the pull-down code,
wherein the T-coil circuit is between the third node and a DQ pad.

19. An electronic device comprising:
an input/output pad;
a driver configured to output a data signal through the input/output pad;
a signal line comprising a first end electrically connected to the driver and a second end electrically connected to the input/output pad; and
a ZQ controller configured to perform a ZQ calibration operation on the driver based on an external resistor,
wherein the driver comprises:
a pull-up driver connected between a power supply voltage and the first end of the signal line; and
a pull-down driver connected between the first end of the signal line and a ground voltage,
wherein, the ZQ controller is configured to:
connect the external resistor and the second end of the signal line;
generate a first pull-up code by comparing a first voltage of the first end of the signal line and a pull-up reference voltage;
generate a second pull-up code by comparing a second voltage of the second end of the signal line and the pull-up reference voltage; and
generate an offset code corresponding to a resistance of the signal line based on the first pull-up code and the second pull-up code.

20. The electronic device of claim 19, wherein the ZQ controller is further configured to:
generate a compensated pull-up code by applying the offset code to the first pull-up code or the second pull-up code based on a target resistance of the pull-up driver.

* * * * *